US012804018B2

(12) United States Patent
Gholizadeh et al.

(10) Patent No.: US 12,804,018 B2
(45) Date of Patent: Nov. 17, 2026

(54) SYSTEMS AND METHODS FOR REDIRECTION OF INCOMING CONTACTS

(71) Applicant: NICE LTD., Ra'anana (IL)

(72) Inventors: Roozbeh Gholizadeh, Sandy, UT (US); Robert Vukich, Sandy, UT (US); Isaac Duckworth, Sandy, UT (US); Carlos Miranda, Coral Springs, FL (US)

(73) Assignee: NICE LTD., Ra'anana (IL)

(*) Notice: Subject to any disclaimer, the term of this patent is extended or adjusted under 35 U.S.C. 154(b) by 217 days.

(21) Appl. No.: 18/490,515

(22) Filed: Oct. 19, 2023

(65) Prior Publication Data

US 2025/0133122 A1 Apr. 24, 2025

(51) Int. Cl.

| | |
|---|---|
| ***H04M 3/00*** | (2024.01) |
| ***H04L 12/66*** | (2006.01) |
| ***H04L 65/1069*** | (2022.01) |
| ***H04L 65/1104*** | (2022.01) |
| ***H04M 3/42*** | (2006.01) |
| ***H04M 5/00*** | (2006.01) |

(52) U.S. Cl.
CPC ...... *H04L 65/1069* (2013.01); *H04L 65/1104* (2022.05); *H04M 3/42059* (2013.01)

(58) Field of Classification Search
CPC ...... H04M 7/006; H04M 7/12; H04M 3/5191; H04M 3/5232; H04M 3/2218; H04M 3/36; H04M 15/41; H04M 15/43; H04M 15/44; H04L 1/1854; H04L 12/66; H04L 43/045; H04L 47/122; H04L 65/1043; H04L 65/80; H04L 12/1482; H04L 41/5003; H04L 47/822; H04L 47/805; H04L 47/10; H04L 41/5067; H04L 65/1046; G06F 3/0635
See application file for complete search history.

(56) References Cited

U.S. PATENT DOCUMENTS

| | | | | |
|---|---|---|---|---|
| 7,822,871 B2 * | 10/2010 | Stolorz | H04L 41/0894 | 709/224 |
| 10,701,215 B1 * | 6/2020 | Oliver | H04M 15/62 | |
| 2005/0033794 A1 * | 2/2005 | Aridor | H04L 67/1012 | 709/200 |
| 2009/0180381 A1 * | 7/2009 | Noel | H04L 47/20 | 370/233 |
| 2013/0129068 A1 * | 5/2013 | Lawson | H04M 3/51 | 379/242 |
| 2014/0079207 A1 * | 3/2014 | Zhakov | H04M 3/5233 | 379/265.03 |
| 2016/0294646 A1 * | 10/2016 | Kirner | H04L 41/0894 | |
| 2023/0308901 A1 * | 9/2023 | De Andrade | H04W 24/08 | |
| 2024/0095058 A1 * | 3/2024 | Pole | G06F 9/452 | |

* cited by examiner

*Primary Examiner* — Kharye Pope

(57) ABSTRACT

A system is adapted to automatically optimize the routing of incoming calls. The system includes: a session controller; a first group of media servers; a second group of media servers; and a processor configured to perform operations. The operations include: regularly polling the first group of media servers to determine a first group of most-available servers, and regularly polling the second group of media servers to determine a second group of most-available servers. The operations also include, when the session controller receives an inbound call: selecting a server from the first group of most-available servers or the second group of most-available servers; and connecting the inbound call to the selected server.

20 Claims, 22 Drawing Sheets

SYSTEMS AND METHODS FOR REDIRECTION OF INCOMING CONTACTS

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

TECHNICAL FIELD

The subject matter described herein relates to systems and methods for optimizing the routing of telephone calls and digital communications. This point of contact redirector has particular but not exclusive utility for load leveling of communications across a plurality of contact centers.

BACKGROUND

A point of contact (POC) refers to a toll-free number (TFN) or direct inward dialing (DID) telephone number that a contact center's patrons dial to connect with the contact center's agents (e.g., tech support, customer support agents, etc.). Each POC is unique and hosted in one of a number of clusters (e.g., potentially dozens or hundreds of clusters) operating across multiple countries (e.g., the US, Canada, UK, Germany, Australia, Japan, Singapore, Brazil, etc.). Each cluster includes a number of media servers distributed across two sites to ensure geo-redundancy. For example, in the US, clusters may comprise media servers in Los Angeles and Dallas. Clusters can vary in size, ranging from as few as two media servers to more than 60 media servers per site, depending on the size of the contact centers they service. In an example, the contact center network of Nice LTD operates over four thousand media servers to support contact center customers and patrons globally. For purposes of this document, the word "customer" may refer to a corporation or other entity that uses one or more contact centers within the network, whereas "patron" may refer to an individual person who seeks to contact an agent in one of the contact centers.

Besides inbound calls from patrons to POCs, there are also calls made by agents using real-time chat (e.g., WebRTC) to clusters and their respective media servers. Each type of traffic is handled by its own type of session border controller (SBC), which is a processor that regulates Internet protocol (IP) communications flows at the borders between networks. SBCs can be used to regulate various forms of real-time communications, including voice-over-IP (VoIP), IP video, text chat, and collaboration sessions. In an example, SBCs provided by Ribbon Communications manage patron traffic, while SBCs from AudioCodes manage agent WebRTC, although other SBCs or types of SBCs may be used instead or in addition. When a patron needs to speak to an agent using WebRTC, the call center platform may for example start a call from the agent's web browser to the AudioCodes SBC. The call includes a POC that uniquely identifies the cluster hosting the patron.

Currently, the routing for all POCs, clusters, and media servers may be manually configured, to distribute ingress traffic to all the media servers within a cluster. For example, consider "Cluster C44" in the US, comprising 13 media servers in Los Angeles and 13 media servers in Dallas. When a call comes in from the public switched telephone network (PSTN) to the SBC, the SBC distributes the traffic evenly across all 26 media servers in the cluster. As a result, each media server receives, on average, approximately 3.85% of all inbound traffic.

However, this current solution has limitations that affect the ability to operate a Contact Center network optimally and efficiently due to various problems in the art:

- Uneven media server Utilization: Because clusters contain both inbound (patron to agent) and outbound (agent to patron) traffic, and because outbound traffic is processed by the media servers hosting the agent, media servers can be unevenly loaded. Depending on the volume of outbound campaigns conducted by agents on different media servers, some media servers may be under heavy load, while others remain underutilized.
- Out of Capacity media servers: SBCs are not currently aware of capacity used by media servers and thus can route a call to a media server that is unable to accept it.
- Lack of media server Status Awareness: Since the SBCs are not aware of the status of the media servers, they continue to send calls to media servers that may be unavailable because of maintenance, upgrades, or unexpected outages.
- Manual, Complex, and Error-Prone SBC Configuration: The current routing configuration at the SBC is manual, and may be burdensome and error-prone. Managing configurations across multiple SBCs and SBC types (e.g., Ribbon Communications SBCs and AudioCodes SBCs) can be operationally challenging, since they are configured independently and use different syntaxes.
- Limitation in media server Location for Call Routing: The existing routing implementation and complexities confine media server location to the local site when calls come in via an SBC co-located with the media servers. This lack of geo-redundancy poses a risk of service loss during outages. The POC redirector seeks to overcome this limitation, implementing a solution that leverages media servers in both sites while prioritizing local media servers for improved reliability.
- Limited Features and Functionalities: The capabilities of current SBCs are limited, making it challenging to implement new routing features or introduce new services.

It should therefore be appreciated that such commonly used SBC implementations have several issues and limitations, resulting in sub-optimal utilization of cluster resources. There are other alternatives, for example, using generic or session initiation protocol (SIP)-aware load balancers, but this solution does not distribute call traffic based on the state and utilization of media servers and does not provide the powerful added benefits disclosed herein.

The information included in this Background section of the specification, including any references cited herein and any description or discussion thereof, is included for technical reference purposes only and is not to be regarded as subject matter by which the scope of the disclosure is to be bound.

SUMMARY

Disclosed is a point of contact (POC) redirector. The POC redirector distributes inbound call traffic to the least-loaded media servers, ensuring a balanced load distribution across all servers. The POC redirector accomplishes this by being aware of the capacity used by each server, and routing new inbound traffic accordingly, and by automatically ignoring unavailable media servers. The POC redirector also simplifies the configuration process by implementing centralized and automated routing across multiple SBC types/configurations. The POC redirector also seeks to overcome geo-redundancy limitations, by leveraging media servers in two or more geographic sites of a cluster, while prioritizing local media servers for improved reliability.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system adapted to automatically optimize the routing of incoming calls. The system includes a session controller; a first plurality of media servers; a second plurality of media servers; and a processor and a non-transitory computer readable medium operably coupled thereto, the computer readable medium may include a plurality of instructions stored in association therewith that are accessible to, and executable by, the processor, to perform operations. The operations include: regularly polling the first plurality of media servers to determine a first group of most-available servers, regularly polling the second plurality of media servers to determine a second group of most-available servers, when the session controller receives an inbound call: selecting a server from the first group of most-available servers or the second group of most-available servers, and connecting the inbound call to the selected server. Other embodiments of this aspect include corresponding computer systems, apparatus, and computer programs recorded on one or more computer storage devices, each configured to perform the actions of the methods.

Implementations may include one or more of the following features. In some embodiments, the first group of most-available servers or the second group of most-available servers may include three servers. In some embodiments, determining the first group of most-available server; or determining the second group of most-available servers; or selecting a server from the first group of most-available servers; or selecting a server from the second group of most-available servers involves a workflow that may include at least one rule. In some embodiments, the at least one rule may include a Boolean expression. In some embodiments, the operations further may include: if the Boolean expression is true, performing a first action; and if the Boolean expression is false, performing a second action. In some embodiments, the at least one rule may include at least one nested rule. In some embodiments, the workflow involves preferentially routing the incoming call to a server of the first group of preferred servers or the second group of preferred servers that is geographically closest to a point of origin of the incoming call. In some embodiments, the first plurality of media servers and the second plurality of media servers are located in separate geographic regions. In some embodiments, determining the first group of most-available servers and determining the second group of most-available servers involves searching for least-used servers that are not subject to duress or outage. In some embodiments, connecting the inbound call to the selected server involves generating a routing detail record containing at least one of a date, a time, an IP address of a device requesting the call, an incoming call ID, an incoming called number, a transaction ID, an SIP response code, information regarding media servers for multiple choice responses, reject reason for reject responses, incoming x-headers, or incoming calling number. Implementations of the described techniques may include hardware, a method or process, or computer software on a computer-accessible medium.

One general aspect includes a computer-implemented method adapted to automatically optimize the routing of incoming calls. The computer-implemented method includes regularly polling a first plurality of media servers to determine a first group of most-available servers. The method also includes regularly polling a second plurality of media servers to determine a second group of most-available servers. The method also includes, when a session controller receives an inbound call: selecting a server from the first group of most-available servers or the second group of most-available servers, and connecting the inbound call to the selected server. Other embodiments of this aspect include corresponding computer systems, apparatus, and computer programs recorded on one or more computer storage devices, each configured to perform the actions of the methods.

Implementations may include one or more of the following features. In some embodiments, the first group of most-available servers or the second group of most-available servers may include three servers. In some embodiments, determining the first group of most-available server; or determining the second group of most-available servers; or selecting a server from the first group of most-available servers; or selecting a server from the second group of most-available servers involves a workflow may include at least one rule. In some embodiments, the at least one rule may include a Boolean expression. In some embodiments, the method may further include: if the Boolean expression is true, performing a first action; and if the Boolean expression is false, performing a second action. In some embodiments, the at least one rule may include at least one nested rule. In some embodiments, the workflow involves preferentially routing the incoming call to a server of the first group of preferred servers or the second group of preferred servers that is geographically closest to a point of origin of the incoming call. In some embodiments, the first plurality of media servers and the second plurality of media servers are located in separate geographic regions. In some embodiments, determining the first group of most-available servers and determining the second group of most-available servers involves searching for least-used servers that are not subject to duress or outage. In some embodiments, connecting the inbound call to the selected server involves generating a routing detail record containing at least one of a date, a time, an IP address of a device requesting the call, an incoming call ID, an incoming called number, a transaction ID, an SIP response code, information regarding media servers for multiple choice responses, reject reason for reject responses, incoming x-headers, or incoming calling number. Implementations of the described techniques may include hardware, a method or process, or computer software on a computer-accessible medium.

The point of contact redirector disclosed herein has particular, but not exclusive, utility for load leveling of media servers supporting a contact center network.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the point of contact redirector, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which

DETAILED DESCRIPTION

Figure 1:
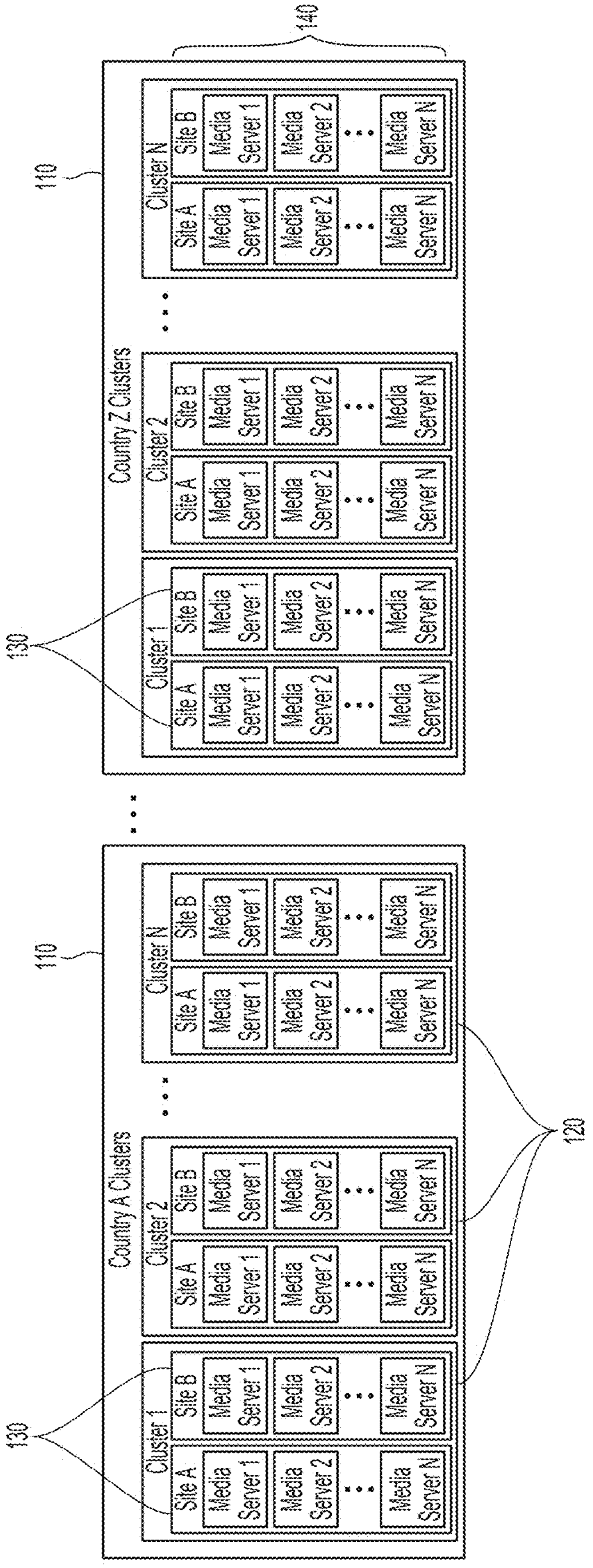
FIG. 1 is a schematic, diagrammatic representation of an example contact center architecture, in accordance with at least one embodiment of the present disclosure.

In accordance with at least one embodiment of the present disclosure, a point of contact (POC) redirector is provided. One important function of the POC redirector is to distribute inbound traffic to the media servers with the lowest utilization, thus ensuring a balanced load distribution across all servers in the network. The POC redirector solves this problem by being aware, in real time or near-real time, of the utilization levels of each server, for both inbound and outbound traffic. The POC redirector then routes new inbound traffic accordingly, while also ignoring unavailable media servers and reinstating them for potential utilization as soon as they become operational. In addition, the POC redirector simplifies the configuration process by implementing centralized and automated routing across multiple SBC types/configurations, and provides support if additional SBC types, configurations, or vendors are needed in the future. The POC redirector also seeks to overcome the geo-redundancy limitations of current systems, by leveraging media servers in two or more geographic sites of a cluster (or two or more clusters in a country, etc.) while, for improved reliability, prioritizing media servers that are local or closer to an inbound call's point of origin. The capabilities of current SBCs are limited, making it challenging to implement new routing features or introduce new services. The POC redirector addresses this issue by providing more flexible, advanced, and configurable routing capabilities.

The POC redirector thus represents a solution that can optimize the utilization of contact center resources, to manage incoming calls efficiently, handle high call volumes, and ensure that media servers are used effectively. Such optimized resource utilization can enhance the overall performance, productivity, reliability, and manageability of contact center operations. The solution will optimize resource utilization, help ensure a balanced load distribution, improve media server availability, simplify routing configurations, and offer advanced features for more efficient call handling.

Implementing the POC redirector disclosed herein offers multiple benefits, particularly in resolving challenges related to routing configuration complexity. Configuring the SBCs to route calls to a few global POC redirectors, instead of thousands of individual media servers, reduces the routing table size by orders of magnitude. Centralizing and streamlining the routing decisions through the POC redirectors thus enhances efficiency and simplifies management of the routing infrastructure, allowing it to adapt quickly to changing business needs.

To illustrate the impact, consider the scenario where 6 POC redirectors are deployed globally, addressing them individually by hostname or IP address. The routing tables for the patron traffic SBCs would only require approximately 180 routing entries (30 SBCs×6 POC redirectors) compared to over 120,000 routing entries (30 SBCs×4000 media servers) today. Addressing the POC redirector by fully qualified domain name, with name authority pointer and service records, can reduce this further to just 30 routing entries.

Overall, this aspect of the POC redirector significantly contributes to optimizing resource utilization and improving the overall performance of contact center computing systems, by enabling them to handle additional call volumes with existing resources, thus enhancing customer satisfaction while reducing administrative and operational costs.

This exemplary implementation includes a vital feature that enables the POC redirectors to know the status and load of all media servers by regularly querying the virtual controllers (VCs) via an application program interface (API). In an example, the default polling interval is 10 seconds, but is configurable. Thus, by default, every 10 seconds, the POC redirectors query all the clusters to get updated utilization and status information for all media servers unless configured to a different period. The VC sits on top of the media servers, acting as a middleman between the POC-redirector and the media servers. The VC manages the operations of the media servers including monitoring real-time usage and status. The VC can be accessed via an application program interface (API) running the on the VC. When it is time to poll a cluster, the POC-redirector issues an API call to the VC. The VC then responds with media server utilization and status:

TABLE 1

| API Response | | | | |
|---|---|---|---|---|
| MS Name | MS CONNECTED | MS ENABLED | MS CALLS | MS CAPACITY |
| dal-c62med01 | 1 | 1 | 12 | 1500 |
| dal-c62med02 | 1 | 1 | 12 | 1500 |
| dal-c62med03 | 1 | 1 | 14 | 1500 |
| dal-c62med04 | 1 | 1 | 15 | 1500 |
| dal-c62med05 | 1 | 1 | 13 | 1500 |
| dal-c62med06 | 1 | 1 | 16 | 1500 |
| dal-c62med07 | 1 | 1 | 11 | 1500 |
| dal-c62med08 | 1 | 1 | 12 | 1500 |
| dal-c62med09 | 1 | 1 | 11 | 1500 |
| dal-c62med10 | 1 | 1 | 18 | 1500 |
| dal-c62med11 | 1 | 0 | 0 | 1500 |
| dal-c62med12 | 1 | 0 | 0 | 1500 |
| dal-c62med13 | 1 | 0 | 0 | 1500 |
| dal-c62med14 | 1 | 0 | 0 | 1500 |
| dal-c62med15 | 1 | 0 | 0 | 1500 |
| lax-c62med01 | 1 | 1 | | 1500 |
| lax-c62med02 | 1 | 1 | 12 | 1500 |
| lax-c62med03 | 1 | 1 | 10 | 1500 |
| lax-c62med04 | 1 | 1 | 12 | 1500 |
| lax-c62med05 | 1 | 1 | 10 | 1500 |
| lax-c62med06 | 1 | 1 | 11 | 1500 |
| lax-c62med07 | 1 | 1 | 13 | 1500 |
| lax-c62med08 | 1 | 1 | 14 | 1500 |
| lax-c62med09 | 1 | 1 | 11 | 1500 |
| lax-c62med10 | 1 | 1 | 9 | 1500 |
| lax-c62med11 | 1 | 0 | 0 | 1500 |
| lax-c62med12 | 1 | 0 | 0 | 1500 |
| lax-c62med13 | 1 | 0 | 0 | 1500 |
| lax-c62med14 | 1 | 0 | 0 | 1500 |
| lax-c62med15 | 1 | 0 | 0 | 1500 |

This real-time or near-real-time polling feature addresses two critical issues:

Automatic Awareness of Active media servers: The POC redirector maintains an updated list of all active media servers within a cluster. This eliminates the need for manual changes when deploying new media servers or when existing servers become unavailable during updates, maintenance, or outages. By dynamically updating the list of active media servers, the POC redirector leverages all available media servers for call routing, providing more efficient and reliable routing decisions.

Near-Real-Time Load Balancing: By continuously monitoring the utilization of each media server in near-real-time, the POC redirector gains valuable input and insights into the workload within a cluster. Armed with this information, the system can make better-informed decisions to distribute incoming call traffic more evenly across all operational media servers in the cluster. This load-balancing mechanism ensures that no individual server becomes overwhelmed with calls while others remain underutilized. This allows optimized resource usage and enhances overall system performance.

By implementing this dynamic utilization and status monitoring feature, the POC redirector significantly improves the efficiency and effectiveness of call routing within a contact center. This ensures that active and available media servers are used for call distribution, and load balancing is performed in real time to achieve optimal resource utilization. As a result, the system may be better equipped to handle fluctuations in call volume, and to provide a smoother and more reliable experience for both patrons and agents.

Upon receiving a call for a specific POC, the SBC forwards the call to one of the global POC redirectors by sending a SIP INVITE. The POC redirector, which has access to real-time information about media server utilization and status, determines the optimal set of media servers to handle the call. It then responds to the SBC with a SIP MULTIPLE CHOICES message.

The SIP MULTIPLE CHOICES message contains a list of the IP addresses of the media servers to be attempted in a specific order of priority. The media servers are listed in the order deemed best for handling the call, considering factors such as server load, location, and other relevant criteria including server operational status. The SBC, upon receiving this response, will then attempt to place calls to the listed media servers in the order provided by the POC redirector.

By employing this approach, the POC redirector ensures that the SBC can make informed decisions about the best media servers to attempt for each call, optimizing call routing and load balancing. This dynamic and real-time selection process ensures calls are efficiently distributed across healthy media servers, contributing to better resource utilization and improved performance of the contact center.

The POC redirector considers the locations of both the SBC and the clusters containing the POC when compiling the media servers list for SIP MULTIPLE CHOICE. The number of recommended media servers per site is adjustable but is three per site by default. The behavior of the POC redirector varies depending on whether the SBC and the cluster hosting the POC are co-located or are deployed in different regions, as described below:

1. SBC and cluster are co-located: The POC redirector will prioritize the least three loaded media servers from that location, followed by the least three loaded media servers from the cluster's other site. For example, for a call originating via a Dallas SBC for a U.S. cluster POC, the POC redirector selects the three least loaded media servers in Dallas, followed by the three least loaded media servers in Los Angeles. The SBC will attempt the 3 media servers in Dallas first, and if those fail, attempt the three media servers in Los Angeles. In an example, the media server may be experiencing an outage and not respond at all, or the media server may reject the call with a SIP response, for example 503 Service Unavailable.
2. SBC and Cluster are not co-located: The POC redirector selects the three least loaded media servers from Dallas, and the three least loaded media servers from Los Angeles, arranging all 6 media servers in order of least utilization, regardless of location.

For example, if the call originates in Australia for a POC configured in a U.S. cluster, the POC redirector will return a list containing the three least loaded media servers in Dallas, followed by the three least loaded media servers in Los Angeles, all listed in order of least utilization. The SBC will then attempt the six media servers in the order provided in the response, regardless of their location. For example, first try a media server in Dallas, followed by two media servers in Los Angeles, followed by two more in Dallas, and so on.

By customizing the list of media servers based on the SBC and POC cluster locations, the POC redirector ensures efficient resource utilization and improved call handling for both co-located and geographically dispersed SBCs and clusters.

In some embodiments, the POC redirector also includes a powerful and flexible feature called workflow, which empowers users to customize the behavior of the POC redirector without the need to write code. Workflows contain instructions that define how the POC redirector should behave under specific conditions. They provide a way to implement logic and rules that guide call routing decisions and responses.

The workflows are organized in reverse priority, meaning that when a call is received, the POC redirector will evaluate the workflows in descending order of priority until it finds a matching workflow. Once there is a match, the workflow executes and exits.

Here are some examples of how workflows can customize the POC redirector's behavior:

1. Routing based on specific caller line identification (CLI): A workflow can route calls based on the caller line identification. For example, it can route calls from specific calling numbers to designated media servers, clusters, or other devices.
2. Specifying returned IPs: Workflows can instruct the POC redirector to change the list of media servers returned in the routing response. This allows dynamic changes to call routing based on real-time conditions.
3. Testing Purposes: Workflows can be configured to route specific numbers to predefined IP addresses for testing and verification purposes, allowing for easy testing of new configurations.
4. Routing Logic based on X-Header: If a specific X-Header (e.g., a specific, configurable non-standard message header) is present in the call, the POC redirector can implement a different routing logic, allowing for customized handling of certain types of calls.
5. Blocking Nuisance Traffic: A workflow can reject calls containing specific CLIs to prevent nuisance traffic or unwanted calls from reaching a cluster.
6. Adjusting SIP INVITE messages: A workflow can modify any parameter from the SIP INVITE message, and an SBC can use the altered information to create very complex workflows. For example, a workflow can make a change to contact, originating number, dialed number and all other fields or inject new fields into the SIP RESPONSE.

Workflows provide flexibility and adaptability to the POC redirector, by allowing users to respond to changing requirements, implement new products or services, and fine-tune call routing strategies without complex software development. This feature streamlines the implementation of new features, making the computing system more agile and easier to maintain.

When the POC redirector receives a call, it generates a routing detail record (RDR) that captures all pertinent information related to that call. The RDRs contain comma-separated fields (e.g., 25 different fields per record), and serve a similar purpose to call detail records (CDRs) used in telephony. The RDR contains crucial details that provide insights into the call routing process and help track and analyze call handling performance, for example:

1. Date and Time
2. Called Number
3. Calling Number
4. SBC IP.
5. Routing Decision.
6. Media servers returned, and their associated priorities.

By maintaining a comprehensive record of the call routing process through the RDR, users can monitor and analyze call routing activities. This information can be used for performance evaluation, optimization, and identification of any issues or inefficiencies in the call routing system. The RDR contributes to a deeper understanding of call traffic patterns, and aids in making informed decisions to enhance the overall efficiency and effectiveness of the contact center computing systems and associated operations.

The POC redirector continuously queries clusters to get real-time utilization and status information for all media servers. This dynamic approach allows for precise load balancing by distributing calls based on actual server loads. Existing solutions are believed to generally lack this real-time monitoring capability. The POC redirector also considers the location of both the SBC and the POC cluster when generating a media server list. This location-based approach optimizes call routing for geographically dispersed configurations, which might not be a standard feature in other solutions, particularly in a contact center environment. The ability to route millions of specific numbers to thousands of servers based on near-real-time device utilization and status is a novel application of these technologies.

Implementing the solution for both inbound calls from patrons and inbound calls from Agents using WebRTC within a contact center is an improved approach. This dual routing capability addresses the diverse needs of contact center inbound traffic and enhances overall call handling efficiency. Using Workflows to adjust routing logic dynamically without requiring software development is an improvement over existing systems. This level of flexibility allows administrators to add new routing logic and adjust behavior to suit changing business needs and scenarios. Generating routing detail records (RDRs) for every routing request and response is an improvement in the functioning of a routing device (e.g., a processor), and evaluation of such RDRs may assist in obtaining additional efficiencies. Like CDRs used in voice equipment for billing and logging purposes, the RDRs provide comprehensive information for each routing decision, facilitating troubleshooting, debugging, support, and trend analysis.

Combining these improved elements, the POC redirector offers a comprehensive and innovative solution to optimize call routing in a contact center environment. The application of familiar technologies in a novel setting, combined with flexible and customizable workflow, make the solution more robust and flexible than traditional load balancing or routing implementations. Using RDRs further enhances the capabilities of the POC redirector, enabling unparalleled insights into routing performance and system behavior. Together, these elements contribute to the system performance improvements of the described solution.

The POC redirector can deliver significant value and cost savings to the organization by addressing various aspects of call routing and network reliability. Potential values and benefits of the POC redirector for the example call center network of Nice LTD include, but are not limited to:

1. Network Reliability: By reducing the number of voice network outages related to clusters and SBCs going down, the POC redirector could save, e.g., $500,000 per year in service level agreement (SLA) requirements and associated costs. This improvement in network reliability can lead to enhanced customer satisfaction and reduced downtime.
2. Load Balancing: The POC redirector's load balancing capabilities can lead to substantial cost savings of between 5-10% of annual deployment and maintenance costs of clusters and media servers. This cost optimization helps in efficient resource utilization and infrastructure management.
3. Click-for-Call (New Service): The ability to enable customer websites to dial directly to the platform is expected to generate substantial new revenue, offering a new revenue stream and business expansion opportunity.
4. Disaster Recovery: Business continuity in the face of loss of typical service delivery is an important derived benefit of the POC redirector. Current methodologies require customer or agent awareness of the existence of a problem, and then manual redirection of the network to unaffected POC's. Implementing the POC redirector will enable both threshold level alerting, i.e., X number of POC's have been unreachable and therefore a human decision is needed to redirect POC's to an alternative terminating POC or POC's; and automatic redirection when a certain threshold of POC completion failure is reached. Businesses which rely on some form of inbound call services as significant or critical to their business model will be able to make a cost-benefit analysis based on their traditional reliability and the failure reduction offered by using a POC redirector disaster recovery service. Many businesses may elect to purchase this capability when the savings is rational compared to the loss. Alternatively, implementation of this technology may also benefit from enhanced network POC completion rates, avoiding significant network interruptions, and avoiding current customer reimbursements when the voice network is down. Such reimbursements may for example be based on Service Level Agreement (SLA) obligations. The Disaster Recovery/failure avoidance aspect of the present disclosure can generate and/or save potentially millions of dollars per year in new revenue and savings.

Overall, the POC redirector's impact on network reliability, cost savings, revenue generation from new services, and disaster recovery enhancements highlights its potential as a valuable and revenue-generating solution for a call center management organization. As the technology applies to routing inbound traffic from patrons and agents using WebRTC, it can improve the overall operational effectiveness of a contact center network. Leveraging workflows for dynamic logic change further enhances the system's adaptability and value proposition to meet evolving business needs.

The point of contact redirector may be implemented as a process at least partially viewable on a display, and operated by a control process executing on a processor that accepts user inputs from a keyboard, mouse, or touchscreen interface, and that is in communication with one or more SBCs, clusters, or media servers. In that regard, the control process performs certain specific operations in response to different inputs or selections made at different times. Certain outputs of the point of contact redirector may be printed, shown on a display, or otherwise communicated to human operators. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope of the point of contact redirector. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic, diagrammatic representation of an example contact center architecture 100, in accordance with at least one embodiment of the present disclosure. The contact center architecture is built upon media servers 140 (e.g., physical, virtual, or cloud-based servers running Windows, Unix, etc.), which are responsible for handling telephony traffic using session initiation protocol (SIP) signaling to establish calls and real-time protocol (RTP) to transport voice, also known as media. When a Patron calls a DID (Direct-Inward-Dial) or TFN (Toll-Free Number) to communicate with an Agent, the call traverses an Ingress SBC (Session Border Controller) before reaching a media server 140. Media servers 140 belong to sets known as clusters 120, strategically distributed across the globe to serve our customers better. Each cluster 120 includes media servers 140 spanning two or more sites or locations 130, to ensure geographical resilience. For example, clusters 120 in the U.S. may include media servers in Dallas and Los Angeles, while clusters in Canada may include media servers in Montreal and Toronto. FIG. 1 illustrates a generic call center network 100 with clusters 120 distributed in countries 110 from Country A through Country Z, comprising media servers 1 to N in Site A and Site B for each country.

Before continuing, it should be noted that the examples described above are provided for purposes of illustration, and are not intended to be limiting. Other devices and/or device configurations may be utilized to carry out the operations described herein.

Figure 2:
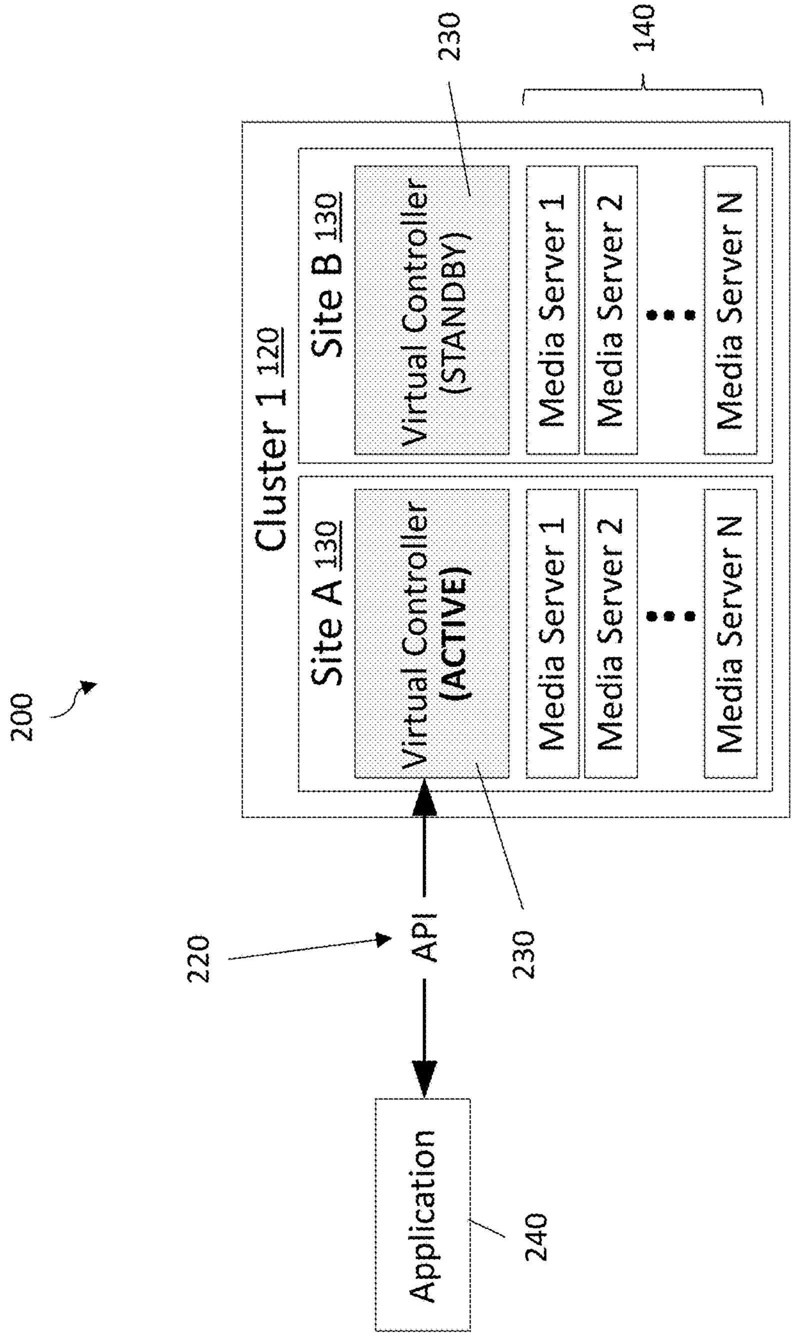
FIG. 2 is a schematic, diagrammatic representation, in block diagram form, of an example contact center architecture, in accordance with at least one embodiment of the present disclosure.

FIG. 2 is a schematic, diagrammatic representation, in block diagram form, of an example contact center architecture 200, in accordance with at least one embodiment of the present disclosure. Besides media servers 140, clusters 120 contain other essential components. Virtual controllers 230 are the processors or central control units responsible for managing the media servers 140 and monitoring their status and utilization. In some embodiments, each site 130 operates a single virtual controller 230, which functions in Active/Standby mode to ensure redundancy, and which is accessible via an application program interface (API) 220. FIG. 2 illustrates a standard cluster and corresponding virtual controller 230.

Virtual controllers 230 offer seamless accessibility through APIs (Application Programming Interfaces) 220 to retrieve comprehensive media server information. These APIs enable querying of the media servers' virtual controller by an application 240 (such as, for example, the POC redirector), providing essential details regarding media server utilization and status. The POC redirector leverages these APIs 220 at customizable intervals to distribute inbound traffic intelligently, maximizing the overall utilization of all active media servers 140 within a cluster 120.

Block diagrams are provided herein for exemplary purposes; a person of ordinary skill in the art will recognize myriad variations that nonetheless fall within the scope of the present disclosure. For example, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein.

Figure 3:
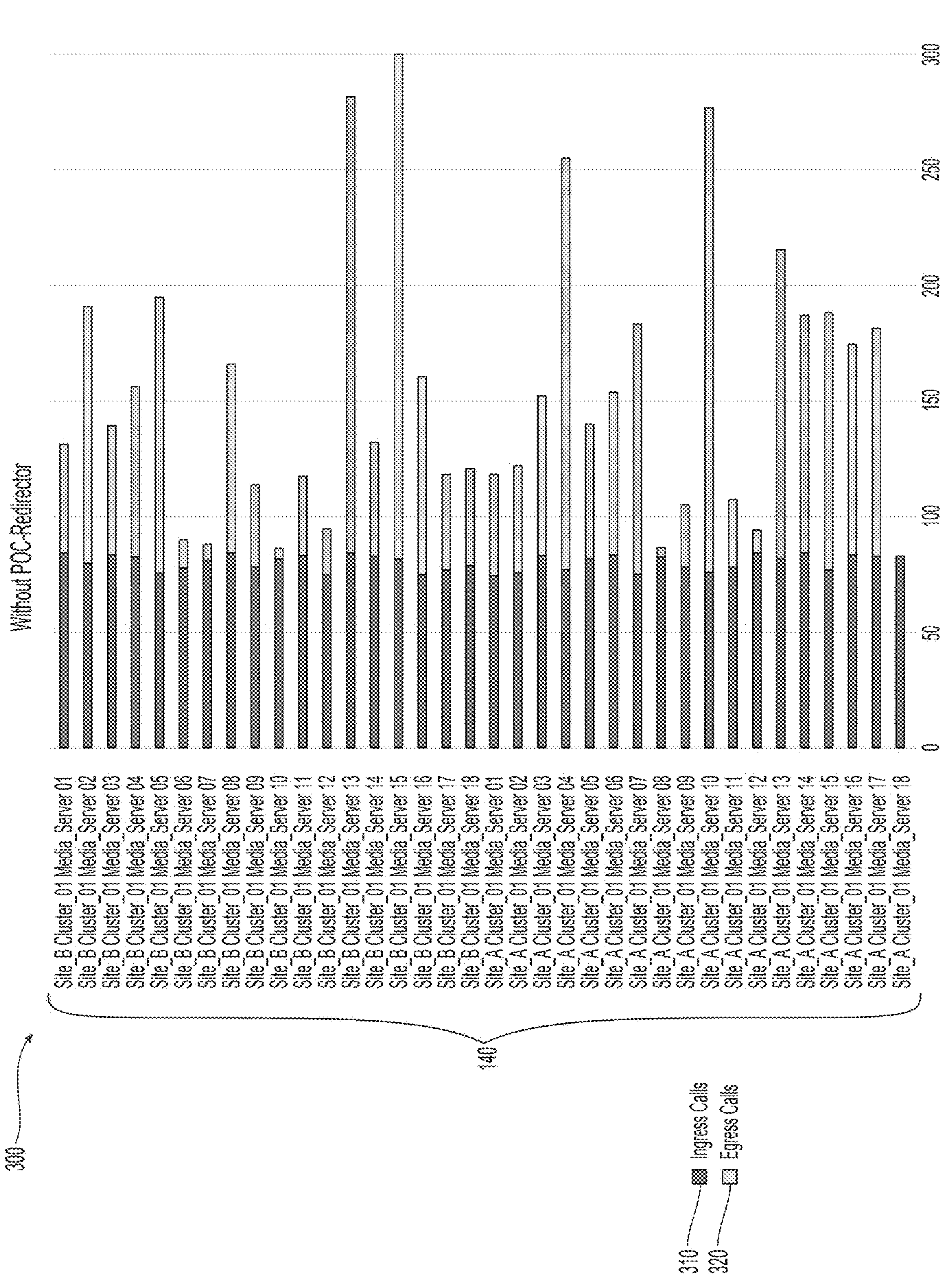
FIG. 3 is a bar graph showing, for current system architectures, a representative system load or utilization for a cluster with two sites and 36 total media servers, in accordance with at least one embodiment of the present disclosure.

FIG. 3 is a bar graph 300 showing, for current system architectures, a representative system load or utilization for a cluster with two sites and 36 total media servers 140, in accordance with at least one embodiment of the present disclosure. As can be seen in the graph 300, while inbound traffic (e.g., ingress calls 310) is distributed evenly (e.g., around 80±5 ingress calls per media server at the time this snapshot was taken), egress traffic (e.g., egress calls 320) can vary significantly (e.g., around 100±100 egress calls per media server), with a minimum near zero and a maximum of greater than 220).

This variance in egress calls can occur based on factors like an agent's location and activity, automated outbound dialer campaigns, etc. For instance, an automated outbound dialer campaign, placing hundreds of simultaneous outbound calls to prospective customers, is assigned to a single media server. The utilization of the media servers shown in FIG. 3 cluster is thus very inefficient. For example, Site B's media server 16 contains approximately three hundred calls, while Site A's media server 08 contains less than 100 calls. If more traffic is added to this cluster, some media servers could become overloaded and start rejecting calls, or even worse, impact voice quality, while others remain underutilized.

One of the primary objectives of the POC redirector is therefore to adjust incoming traffic proactively to ensure an even distribution of the load across all the media servers in a cluster.

Figure 4:
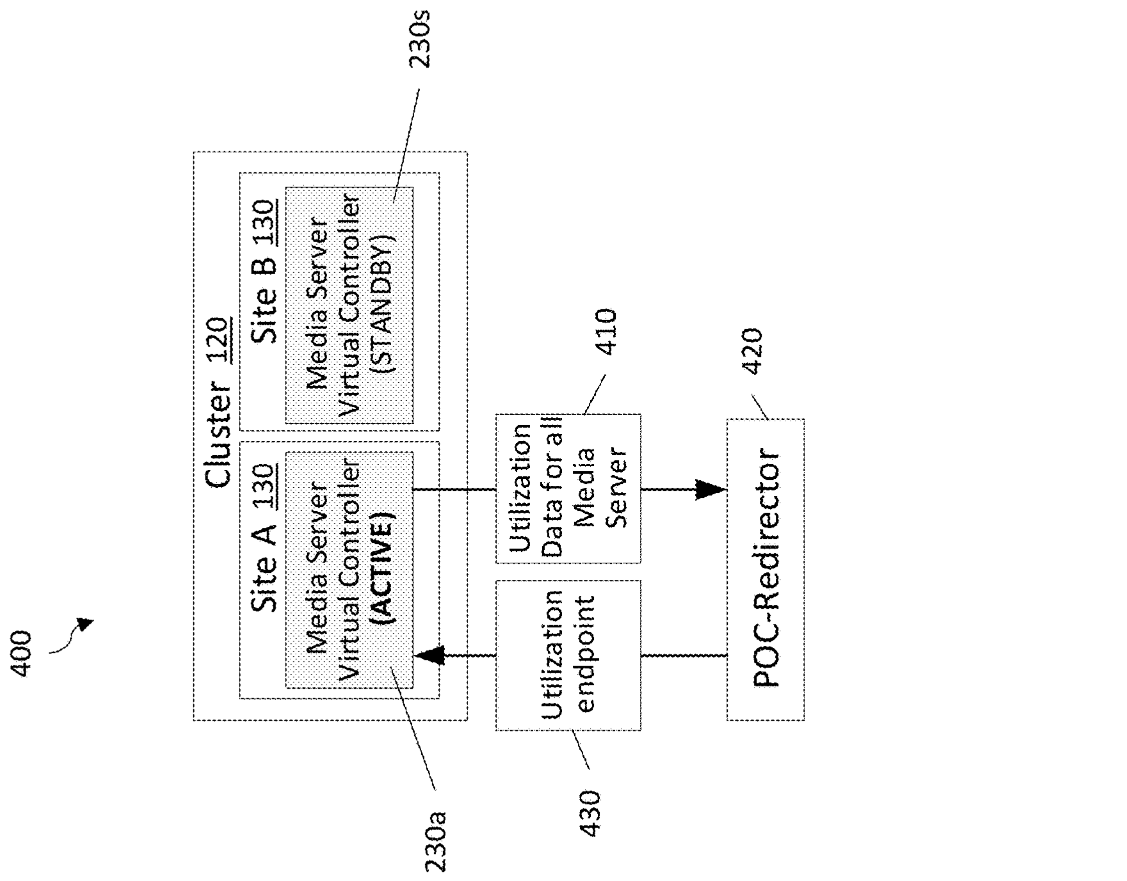
FIG. 4 is a schematic, diagrammatic representation of an example contact center architecture, in accordance with at least one embodiment of the present disclosure.

FIG. 4 is a schematic, diagrammatic representation of an example contact center architecture 400, in accordance with at least one embodiment of the present disclosure. Visible are a cluster 120 with two sites 130. Site A contains an active media server virtual controller **230*a*, while Site B contains a media server virtual controller 230*s* that is in standby mode, available if the first virtual controller 230*a*** becomes incapacitated.

To achieve load leveling, the POC redirector 420 uses the cluster's virtual controller (VC) API (see FIG. 2) at the pre-configured interval (e.g., set to 10 seconds by default), by sending the API a utilization endpoint query 430 and getting back utilization data 410 for all media servers in the cluster. This allows the POC redirector 420 to get near-real-time status and utilization information of the media servers in the cluster. By polling multiple clusters 120 in this way, the POC redirector 420 can obtain utilization and status information for all media servers on the contact center network.

Figure 5:
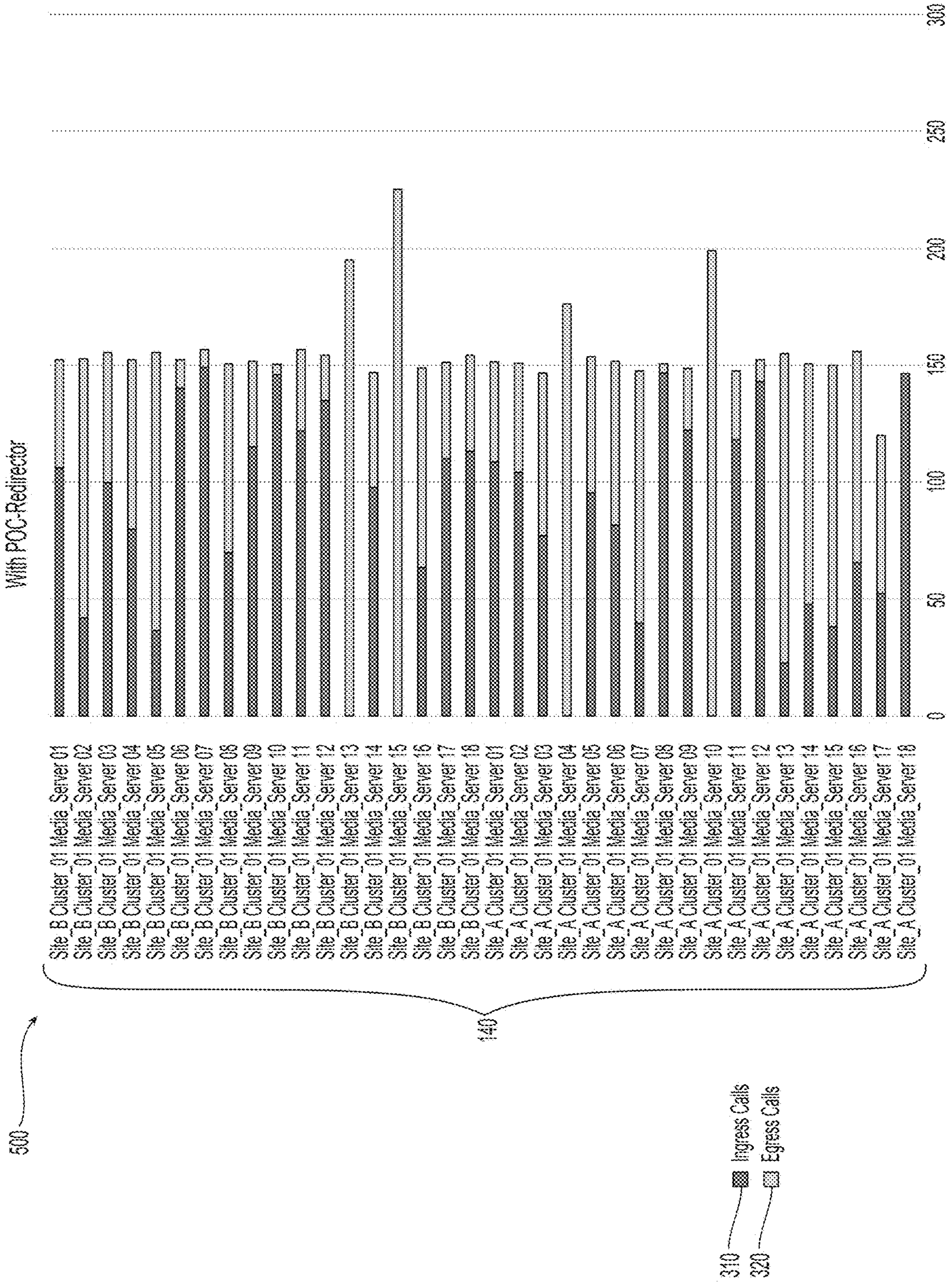
FIG. 5 is a bar graph 500 showing, for the system architecture of FIG. 4, a representative system load or utilization for a cluster with two sites and 36 total media servers, in accordance with at least one embodiment of the present disclosure.

FIG. 5 is a bar graph 500 showing, for the system architecture of FIG. 4, a representative system load or utilization for a cluster with two sites and 36 total media servers 140, in accordance with at least one embodiment of the present disclosure. FIG. 5 illustrates the balanced distribution achieved by the POC redirector when managing ingress traffic. Notably, four media servers (Site B Server 13, Site B Server 15, Site A Server 4, and Site A server 10) no longer receive any incoming traffic at all, due to disproportionately high egress traffic (e.g., due to outgoing call campaigns), while one media server (Site A, Server 18) receives incoming traffic only, as it is not supporting any outgoing traffic. As can be seen in the graph, the total load is very consistent across all servers, except the four being used for outgoing call campaigns.

The POC redirectors play a crucial role in optimizing inbound traffic from the SBCs. Without the POC redirectors, the SBCs rely on manual configurations to distribute inbound traffic evenly across all clusters. However, when the SBCs are configured to direct traffic to the POC redirector, the POC redirector takes charge of instructing the SBCs on where to route the calls. As the name suggests, the POC redirector "re-directs" the SBCs' traffic efficiently to the least-loaded media servers.

Figure 6:
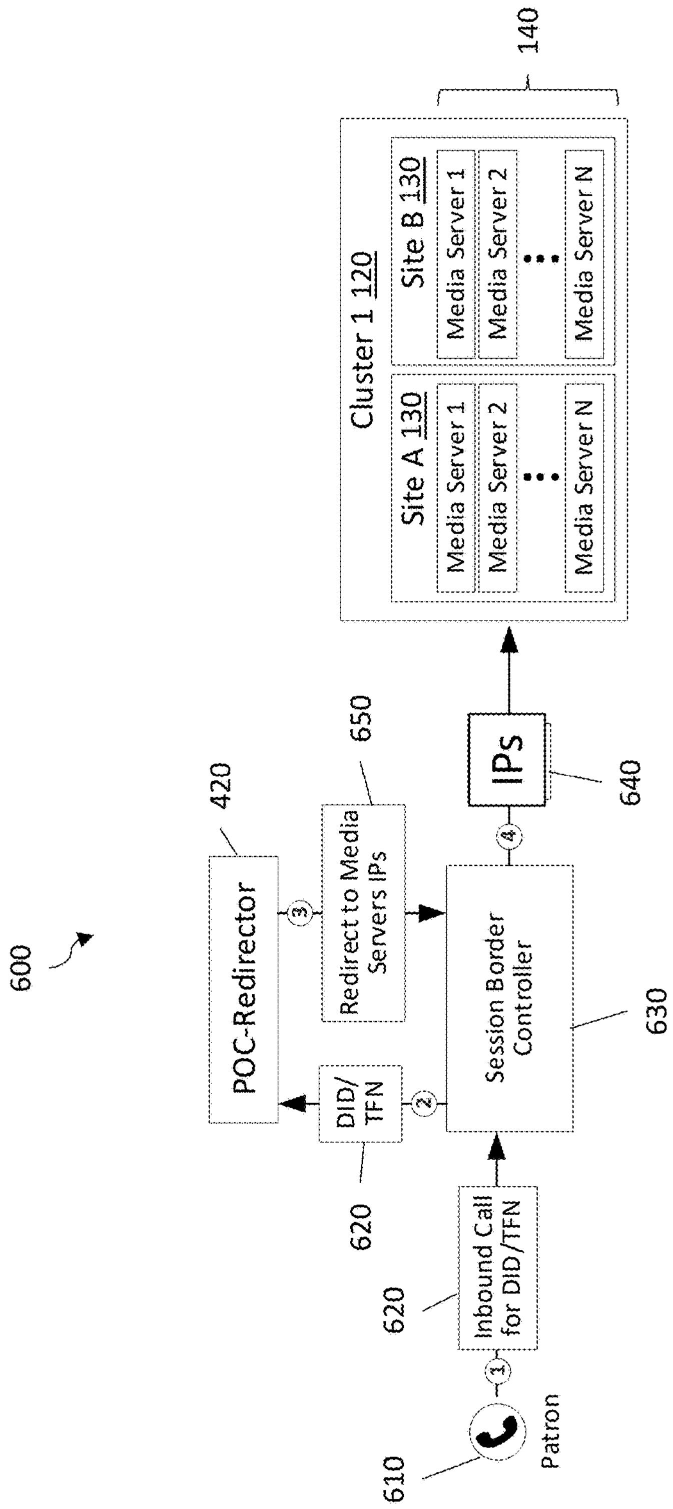
FIG. 6 is a schematic, diagrammatic representation of an example contact center architecture, in accordance with at least one embodiment of the present disclosure.

FIG. 6 is a schematic, diagrammatic representation of an example contact center architecture 600, in accordance with at least one embodiment of the present disclosure. In the example shown in FIG. 6, a patron 610 dials an inbound call 620 to a toll-free number (TFN) or direct inward dialing (DID) telephone number. Once the inbound call reaches the SBC 630, the SBC 630 routes the call 620 to the POC redirector 420. The POC redirector 420 instructs the SBC to send the calls the IP addresses 650 of media servers 140 of a cluster 120, as described above. The SBC then sends the calls to the IP addresses 640 of media servers 140, as instructed by the POC redirector.

Notably, the same principle can be applied to calls from agents using WebRTC to reach a cluster. Here, a separate set of SBCs, which use WebRTC on the inbound leg from the agent and SIP on the outbound leg to the media server, may handle these calls. The phone number dialed by the agent application 715 may for example be private and for internal use only, such as unique numbers that identify the clusters where the user registered. It is noted that the agent's application, rather than the agent themself, typically places the WebRTC call towards the SBC.

Figure 7:
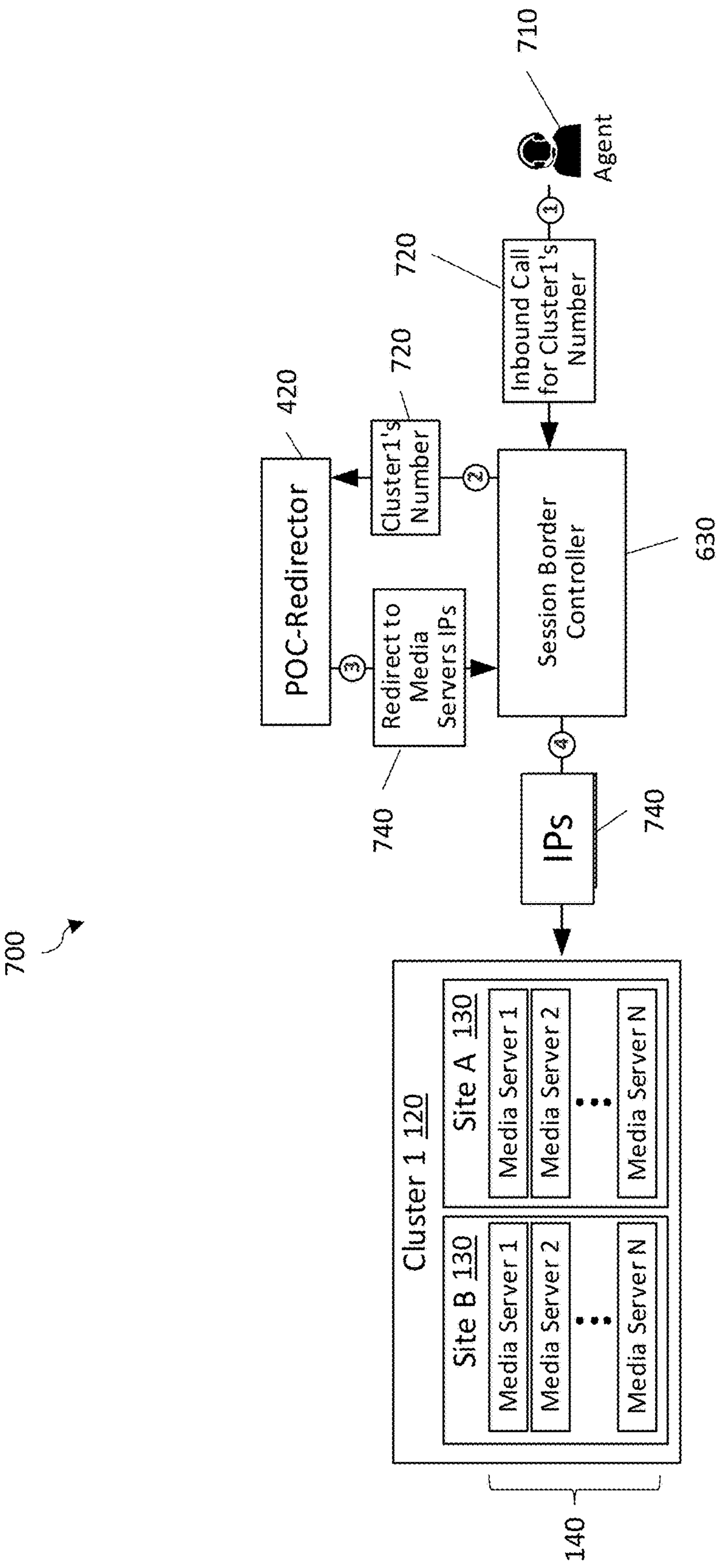
FIG. 7 is a schematic, diagrammatic representation of an example contact center architecture, in accordance with at least one embodiment of the present disclosure.

FIG. 7 is a schematic, diagrammatic representation of an example contact center architecture 700, in accordance with at least one embodiment of the present disclosure. In the example shown in FIG. 7, the Agent's application 710 places a WebRTC call 720 to Cluster 1's POC number. Once the call 720 reaches the SBC 630, the SBC 630 routes the call to the POC redirector 420. The POC redirector 420 instructs the SBC to send the calls to Cluster 1's media servers' IPs 740. The SBC then sends the calls to the media servers' IPs 740 as instructed by the POC redirector 420. Thus, even for an internally generated, internally routed call, the POC redirector 420 is able to make intelligent load leveling decisions by handing the call off to the least-utilized media server 140 in the selected cluster 120.

Figure 8:
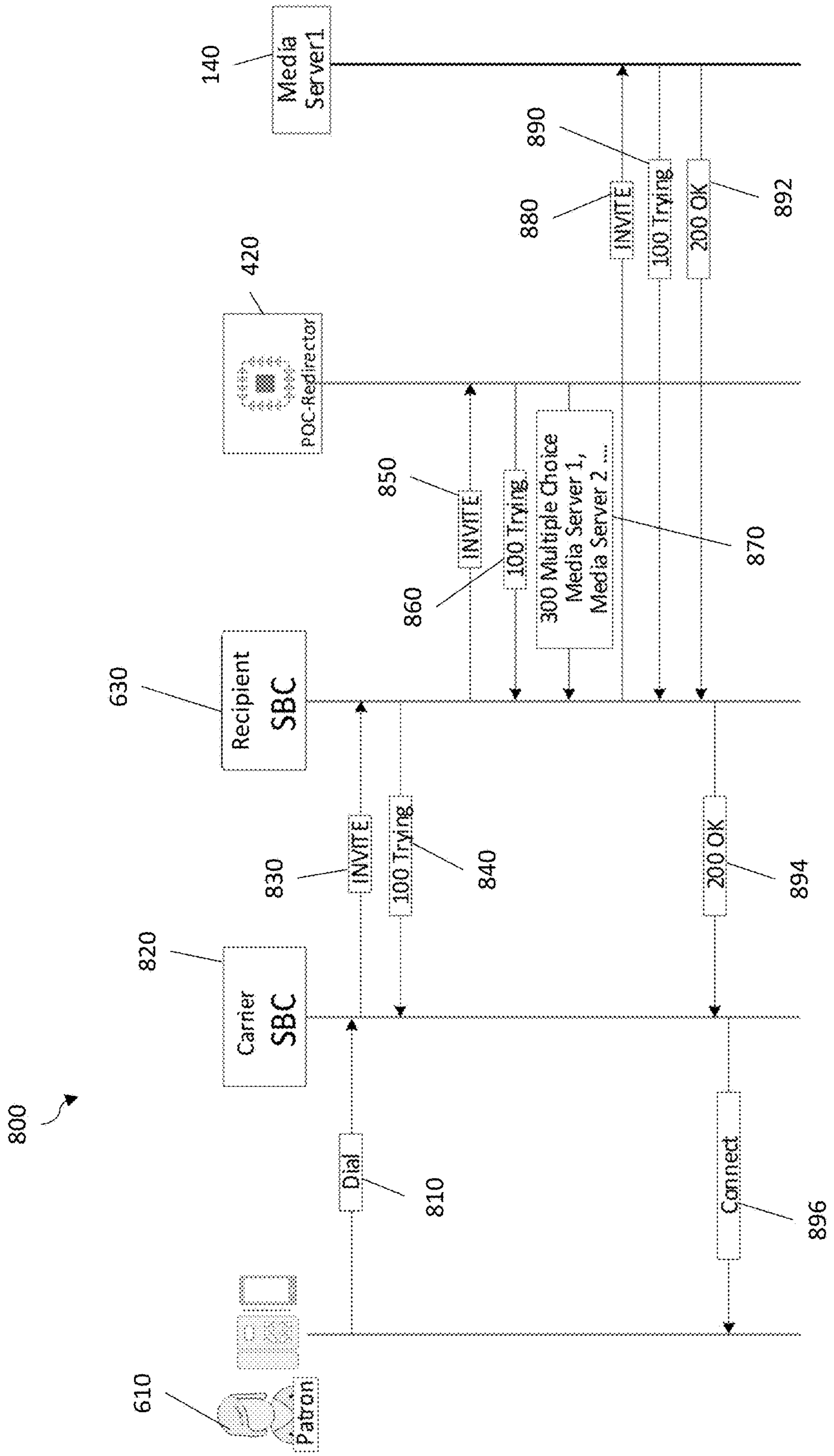
FIG. 8 is a schematic, diagrammatic representation of an example call connection process, in accordance with at least one embodiment of the present disclosure.

FIG. 8 is a schematic, diagrammatic representation of an example call connection process 800, in accordance with at least one embodiment of the present disclosure. As noted above, the communication between the SBCs 630, 820 and the POC redirector 420 may be in standard session initiation protocol (SIP). In the example shown in FIG. 8, a patron 610 dials a number 810, which is received by the carrier SBC 820 (e.g., an SBC under the control of a national telephone network). The carrier SBC 820 issues an Invite message 830 to the recipient SBC 630 (e.g., an SBC of the contact center network), which returns a Trying message 840 to the carrier SBC 820. The recipient SBC also issues an Invite message 850 to the POC redirector 420, which returns a Trying message 860 to the recipient SBC. The POC redirector has information (e.g., current to within 10 seconds) regarding the utilization and availability of all of the media servers 140 on the contact center network, so it is able to return a Multiple Choice message 870 containing, for example, the IP addresses of the six most available media servers 140, ranked in the order in which they should be tried. The recipient SBC then sends an Invite message 880 to the first suggested media server 140, which returns a Trying message 890 to the recipient SBC 630 and, when the call is successfully connected, sends an OK message 892 to the recipient SBC 630, which sends an OK message 894 to the carrier SBC 820, which issues a connection 896, thus connecting the patron 610 to the first media server 140.

Figure 9:
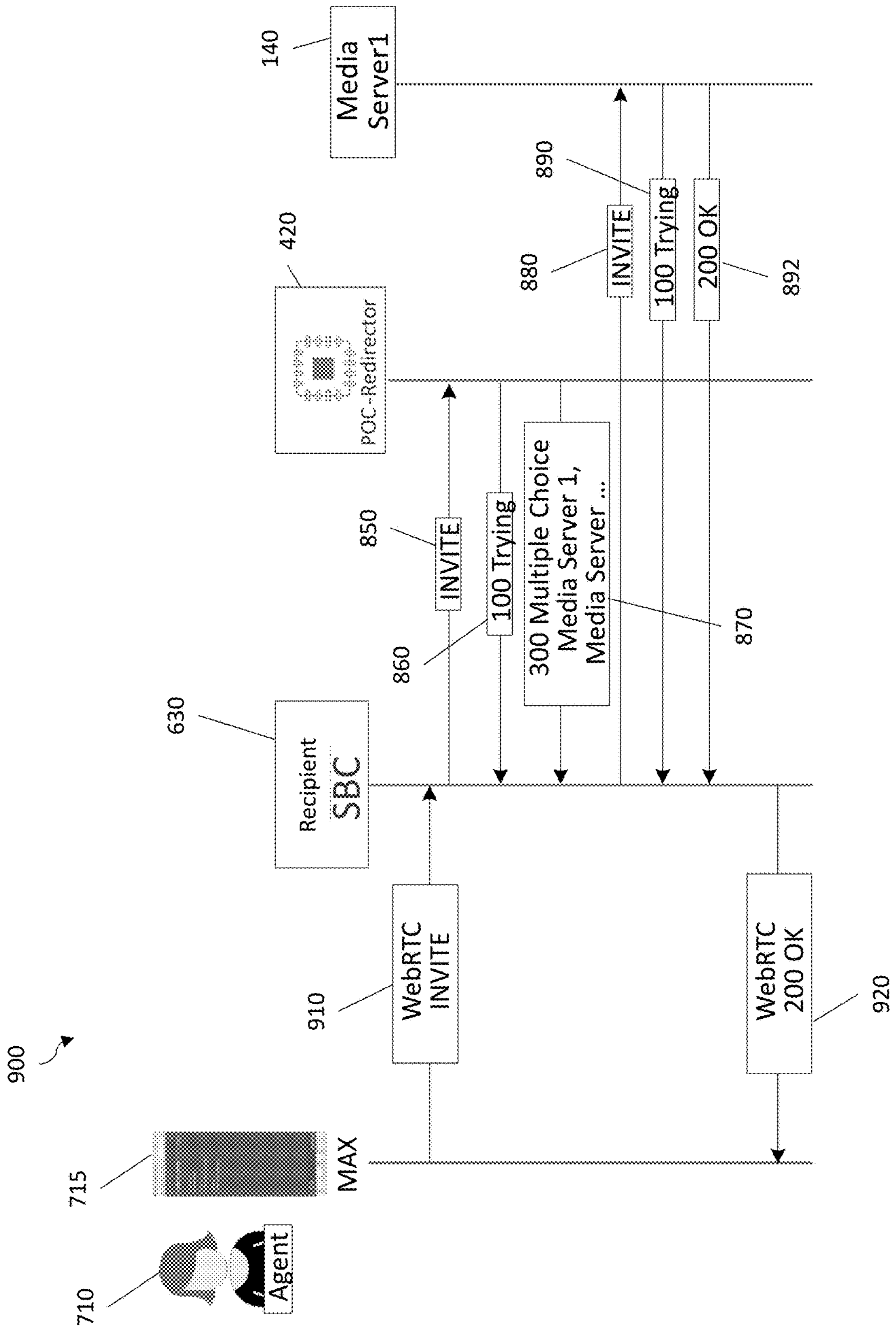
FIG. 9 is a schematic, diagrammatic representation of an example WebRTC call connection process, in accordance with at least one embodiment of the present disclosure.

FIG. 9 is a schematic, diagrammatic representation of an example WebRTC call connection process 900, in accordance with at least one embodiment of the present disclosure. In the example shown in FIG. 9, an agent application 715 of an agent 710 issues a WebRTC chat invitation 910 to a private number associated with a cluster. The Invite message 910 is received by the recipient SBC 630, which issues an Invite message 850 to the POC Redirector 420. The POC Redirector 420 replies with a Trying message 860 and a Multiple Choice message 870 containing the IP addresses of available servers. The recipient SBC then sends an Invite message 880 to the first media server 140, which returns a Trying message 890 and an OK message 892 to the recipient SBC 630. The recipient SBC then sends a WebRTC OK message 920 to the agent software 715 thus allowing the agent 710 to speak with, e.g., a patron who is already connected to the first media server 140.

Figure 10:
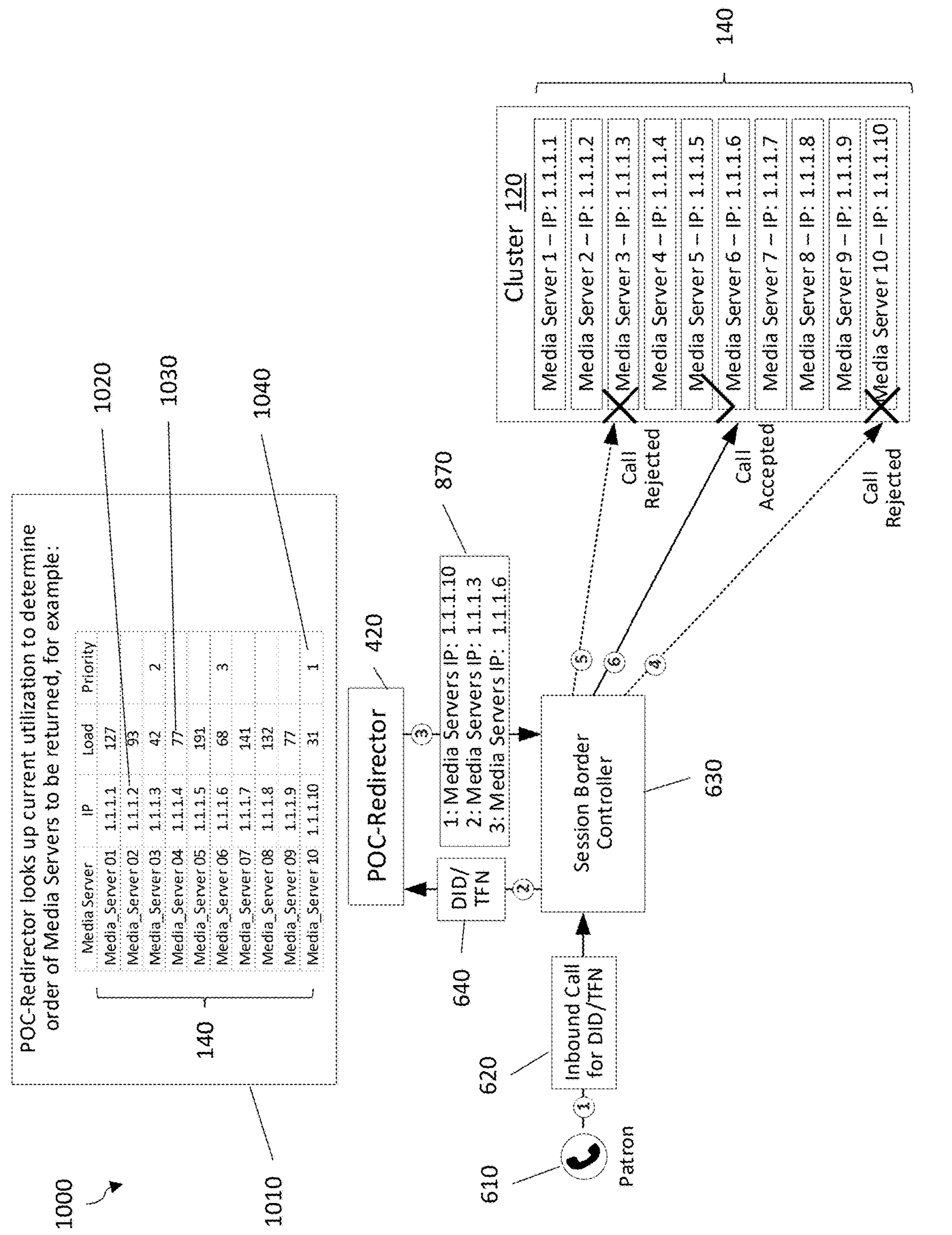
FIG. 10 is a schematic, diagrammatic representation of an example call connection process, in accordance with at least one embodiment of the present disclosure.

FIG. 10 is a schematic, diagrammatic representation of an example call connection process 1000, in accordance with at least one embodiment of the present disclosure. In the example shown in FIG. 10, a patron 610 places an inbound call 620 to a DID or TFN associated with a cluster 120. The call is received by the SBC 630, which sends it to the POC redirector 420.

To ensure the completion of inbound calls to the cluster 120, the POC redirector 420 makes an API call to the cluster's virtual controller, and receives a report 1010 that includes, for each media server 140 in the cluster 120, an IP address 1020 and a load or utilization level (e.g., absolute numbers of calls being handled by the media servers (in cases where all media servers in a cluster can handle the same number of calls) or a percentage between 0 and 100%, with 100% indicating the media server 120 is operating at capacity and cannot accept any additional incoming calls, and 0% indicating the media server is completely unused (e.g., because it has just come online)). For the three most available (e.g., operational and least-loaded) media servers 140, the report 1010 also includes a priority score 1040, with "1" indicating the media server that should be tried first, "2" indicating the media server that should be tried second, etc.

Based on the information in the report 1010, the POC redirector 420 then issues a MULTIPLE CHOICE message 870 containing the three suggested IP addresses in priority order. By default, the POC redirector returns the three least-loaded media servers per site, but this number is configurable. In the example shown in FIG. 10, the SBC 630 first tries to connect to media server 10 (IP 1.1.1.10), but the call is rejected. The SBC 630 then tries to connect to media server 3 (IP 1.1.1.3), and is also rejected. The SBC 630 then tries to connect to Media Server 6 (IP 1.1.1.6), and is accepted. The inbound call 620 can thus be connected to an agent in cluster 120.

Figure 11:
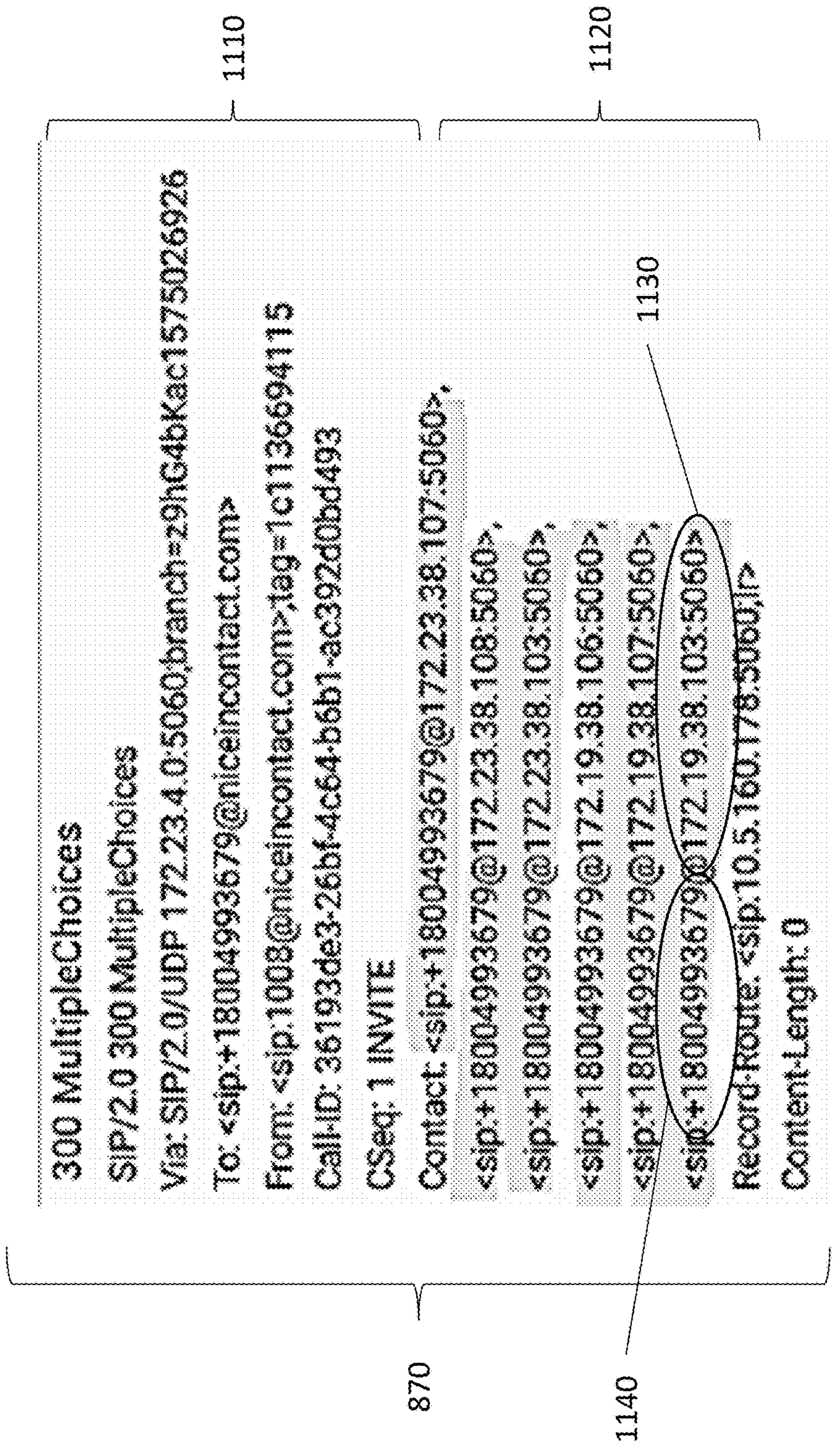
FIG. 11 is a session initiation protocol (SIP) Multiple Choices message, in accordance with at least one aspect of the present disclosure.

FIG. 11 is a session initiation protocol (SIP) Multiple Choices message 870, in accordance with at least one aspect of the present disclosure. The Multiple Choices message 870 includes headers 1110 and six contacts 1120, with each choice 1120 including an IP address 1130 and an associated telephone number 1140.

The POC redirector uses standard SIP (Session Initiation Protocol) to provide the SBC with a list of media servers. From a call perspective, the SBC communicates with the POC redirector as if it were any other device capable of handling the call. The POC redirector responds with a SIP 300 MULTIPLE CHOICE message 870 containing a list of Contacts 1120. Each Contact contains the uniform resource identifier (URI) of each media server in the format <phone number>@IP:port. For example, FIG. 11 is a response to a call to the Toll-Free number 1.800.499.3679, which contains six media servers. The SBC will attempt a call to 172.23.38.107, followed by 172.23.38.108, etc.

Figure 12:
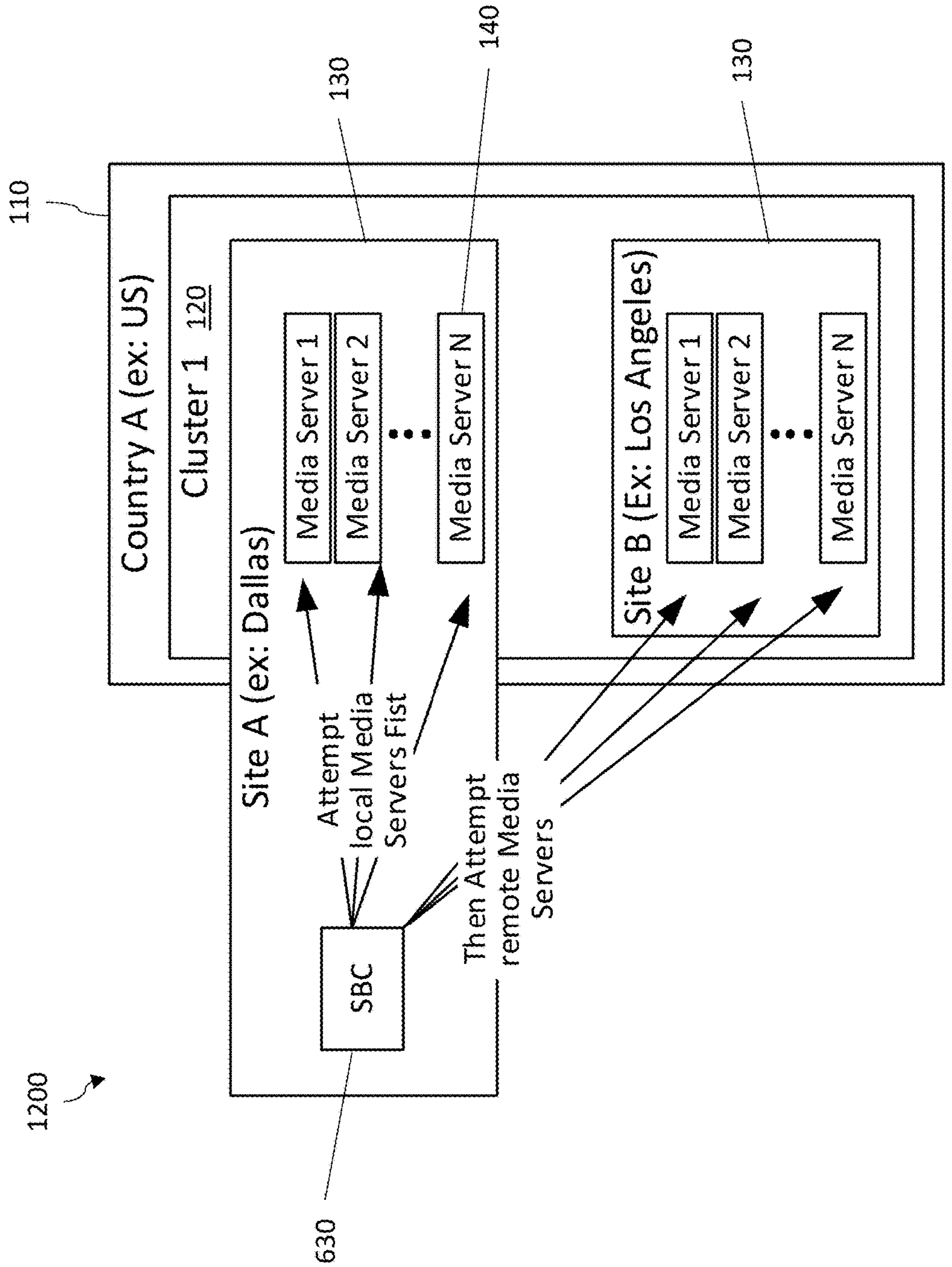
FIG. 12 is a schematic, diagrammatic representation of an example call connection process, in accordance with at least one embodiment of the present disclosure.

FIG. 12 is a schematic, diagrammatic representation of an example call connection process 1200, in accordance with at least one embodiment of the present disclosure. As shown in FIG. 12, the POC redirector adjusts the selection priority of media servers 140 based on the origination SBC 630 and intended cluster locations 110, 130. FIG. 12 illustrates a scenario where the SBC 630 and a site 130 of the target cluster 120 are located in the same city or region. For instance, if a call comes via a Dallas SBC 630 destined for a U.S. cluster 120, the SBC 630 will be instructed to attempt media servers 140 in Dallas first, followed by media servers in Los Angeles. This prioritization maximizes call quality by minimizing latency between the SBC 630 and each media server 140. In the event that all of the local media servers 130 reject the call, the SBC 630 will then attempt media servers at the other site 130. It is noted that, while clusters 120 typically have two sites 130, they could in some instances have only one site, or could have three or more sites, depending on the implementation. In a case where the cluster includes three or more sites, media servers will be prioritized based on the distance between the sites and the SBC. Such embodiments fall explicitly within the scope of the present disclosure.

Figure 13:
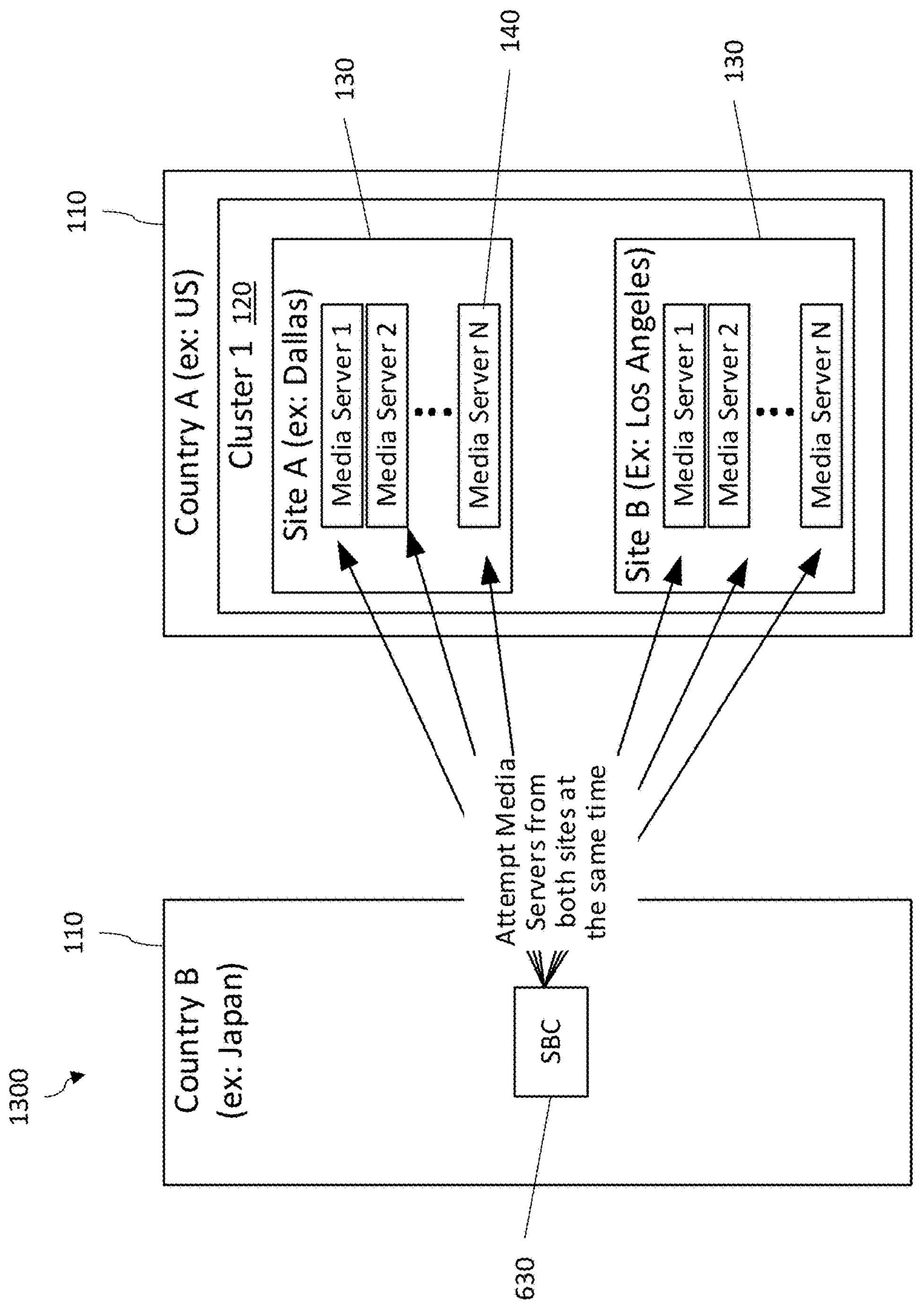
FIG. 13 is a schematic, diagrammatic representation of an example call connection process, in accordance with at least one embodiment of the present disclosure.

FIG. 13 is a schematic, diagrammatic representation of an example call connection process 1300, in accordance with at least one embodiment of the present disclosure. When the SBC 630 is located in a first country 110 and the target cluster 120 is located in a second country 110, the POC redirector will instruct the SBC 630 to attempt media servers simultaneously in both sites 130 of the cluster 120, as shown in FIG. 13. For instance, if a call comes in via an SBC 630 located in Japan, destined for a cluster in the U.S., the SBC 630 will equally attempt media servers both in Dallas and Los Angeles, following the priority set forth by the POC redirector. This is because the latency difference between Japan and Dallas and Japan and Los Angeles may be relatively small. For example, the one-way latency from Tokyo to Los Angeles may be around 50 milliseconds while Tokyo to Dallas may be about 65 milliseconds. The 15-millisecond difference between sites may be negligible to voice quality. In this case there may be no significant benefits for steering calls to Los Angeles over Dallas. Furthermore, since the call is originating outside the country, there may be no savings in terms of network equipment usage, network resource bandwidth consumption etc. by selecting one site over the other. This point is in contrast to media servers that are co-located with an SBC, where there are wide area network (WAN) equipment and bandwidth savings when the calls are kept within the same site as opposed to sending to another site.

Tables 2 and 3 contain two examples of calls placed to Cluster C44 in the U.S. from a Los Angeles SBC and a Sydney SBC, respectively. In Table 2, originating from Los Angeles, the POC redirector prioritizes the Los Angeles media servers in positions 1, 2, and 3, followed by the Dallas media servers in positions 4, 5, and 6.

TABLE 2

| Call Placed from Los Angeles | | | | | | |
|---|---|---|---|---|---|---|
| | C44 Cluster | | Current Condition | | Routes returned by POC-Redirector | |
| | Media Server | Media Server IP | Status | Active Lines | Priority | Contact (POC@Media Server IP) |
| Dallas Media Servers | dal-c44med01 | 172.19.36.149 | ENABLED | 104 | | |
| | dal-c44med02 | 172.19.36.150 | ENABLED | 103 | | |
| | dal-c44med03 | 172.19.36.151 | ENABLED | 102 | | |
| | dal-c44med04 | 172.19.36.152 | ENABLED | 98 | | |
| | dal-c44med05 | 172.19.36.153 | ENABLED | 93 | 6 | <sip: +18004993679@172.19.36.153:5060> |
| | dal-c44med06 | 172.19.38.101 | ENABLED | 96 | | |
| | dal-c44med07 | 172.19.38.102 | ENABLED | 107 | | |
| | dal-c44med08 | 172.19.38.103 | ENABLED | 96 | | |
| | dal-c44med09 | 172.19.38.104 | ENABLED | 131 | | |
| | dal-c44med10 | 172.19.38.105 | ENABLED | 113 | | |
| | dal-c44med11 | 172.19.38.106 | ENABLED | 73 | 4 | <sip: +18004993679@172.19.38.106:5060> |
| | dal-c44med12 | 172.19.38.107 | ENABLED | 97 | | |
| | dal-c44med13 | 172.19.38.108 | ENABLED | 86 | 5 | <sip: +18004993679@172.19.38.108:5060> |
| Los Angeles Media Servers | lax-c44med01 | 172.23.36.149 | ENABLED | 113 | | |
| | lax-c44med02 | 172.23.36.150 | ENABLED | 117 | | |
| | lax-c44med03 | 172.23.36.151 | ENABLED | 102 | | |
| | lax-c44med04 | 172.23.36.152 | ENABLED | 113 | | |
| | lax-c44med05 | 172.23.36.153 | ENABLED | 118 | | |
| | lax-c44med06 | 172.23.38.101 | ENABLED | 103 | | |
| | lax-c44med07 | 172.23.38.102 | ENABLED | 85 | | |
| | lax-c44med08 | 172.23.38.103 | ENABLED | 81 | 3 | <sip: +18004993679@172.23.38.103:5060> |
| | lax-c44med09 | 172.23.38.104 | ENABLED | 76 | 1 | <sip: +18004993679@172.23.38.104:5060> |
| | lax-c44med10 | 172.23.38.105 | ENABLED | 87 | | |
| | lax-c44med11 | 172.23.38.106 | ENABLED | 91 | | |
| | lax-c44med12 | 172.23.38.107 | ENABLED | 98 | | |
| | lax-c44med13 | 172.23.38.108 | ENABLED | 80 | 2 | <sip: +18004993679@172.23.38.108:5060> |

In Table 3, originating from Australia and with similar latency from Sydney to Dallas and Los Angeles, the POC-Redirector combines media servers from both locations based on overall utilization.

TABLE 3

| Call Originating from Sydney | | | | | | |
|---|---|---|---|---|---|---|
| | C44 Cluster | | Current Condition | | Routes returned by POC-Redirector | |
| | Media Server | Media Server IP | Status | Active Lines | Priority | Contact (POC@Media Server IP) |
| Dallas Media Servers | dal-c44med01 | 172.19.36.149 | ENABLED | 37 | | |
| | dal-c44med02 | 172.19.36.150 | ENABLED | 35 | | |
| | dal-c44med03 | 172.19.36.151 | ENABLED | 32 | 6 | <sip: +18004993679@172.19.36.151:5060> |
| | dal-c44med04 | 172.19.36.152 | ENABLED | 42 | | |

TABLE 3-continued

| Call Originating from Sydney | | | | | | |
|---|---|---|---|---|---|---|
| | C44 Cluster | | Current Condition | | Routes returned by POC-Redirector | |
| | Media Server | Media Server IP | Status | Active Lines | Priority | Contact (POC@Media Server IP) |
| | dal-c44med05 | 172.19.36.153 | ENABLED | 27 | 2 | <sip: +18004993679@172.19.36.153:5060> |
| | dal-c44med06 | 172.19.38.101 | ENABLED | 33 | | |
| | dal-c44med07 | 172.19.38.102 | ENABLED | 37 | | |
| | dal-c44med08 | 172.19.38.103 | ENABLED | 32 | | |
| | dal-c44med09 | 172.19.38.104 | ENABLED | 30 | 5 | <sip: +18004993679@172.19.38.104:5060> |
| | dal-c44med10 | 172.19.38.105 | ENABLED | 40 | | |
| | dal-c44med11 | 172.19.38.106 | ENABLED | 38 | | |
| | dal-c44med12 | 172.19.38.107 | ENABLED | 42 | | |
| | dal-c44med13 | 172.19.38.108 | ENABLED | 47 | | |
| Los Angeles Media Servers | lax-c44med01 | 172.23.36.149 | ENABLED | 36 | | |
| | lax-c44med02 | 172.23.36.150 | ENABLED | 32 | | |
| | lax-c44med03 | 172.23.36.151 | ENABLED | 42 | | |
| | lax-c44med04 | 172.23.36.152 | ENABLED | 31 | | |
| | lax-c44med05 | 172.23.36.153 | ENABLED | 40 | | |
| | lax-c44med06 | 172.23.38.101 | ENABLED | 28 | | |
| | lax-c44med07 | 172.23.38.102 | ENABLED | 36 | | |
| | lax-c44med08 | 172.23.38.103 | ENABLED | 38 | | |
| | lax-c44med09 | 172.23.38.104 | ENABLED | 24 | 1 | <sip: +18004993679@172.23.38.104:5060> |
| | lax-c44med10 | 172.23.38.105 | ENABLED | 28 | 3 | <sip: +18004993679@172.23.38.105:5060> |
| | lax-c44med11 | 172.23.38.106 | ENABLED | 41 | | |
| | lax-c44med12 | 172.23.38.107 | ENABLED | 28 | 4 | <sip: +18004993679@172.23.38.107:5060> |
| | lax-c44med13 | 172.23.38.108 | ENABLED | 45 | | |

Figure 14:
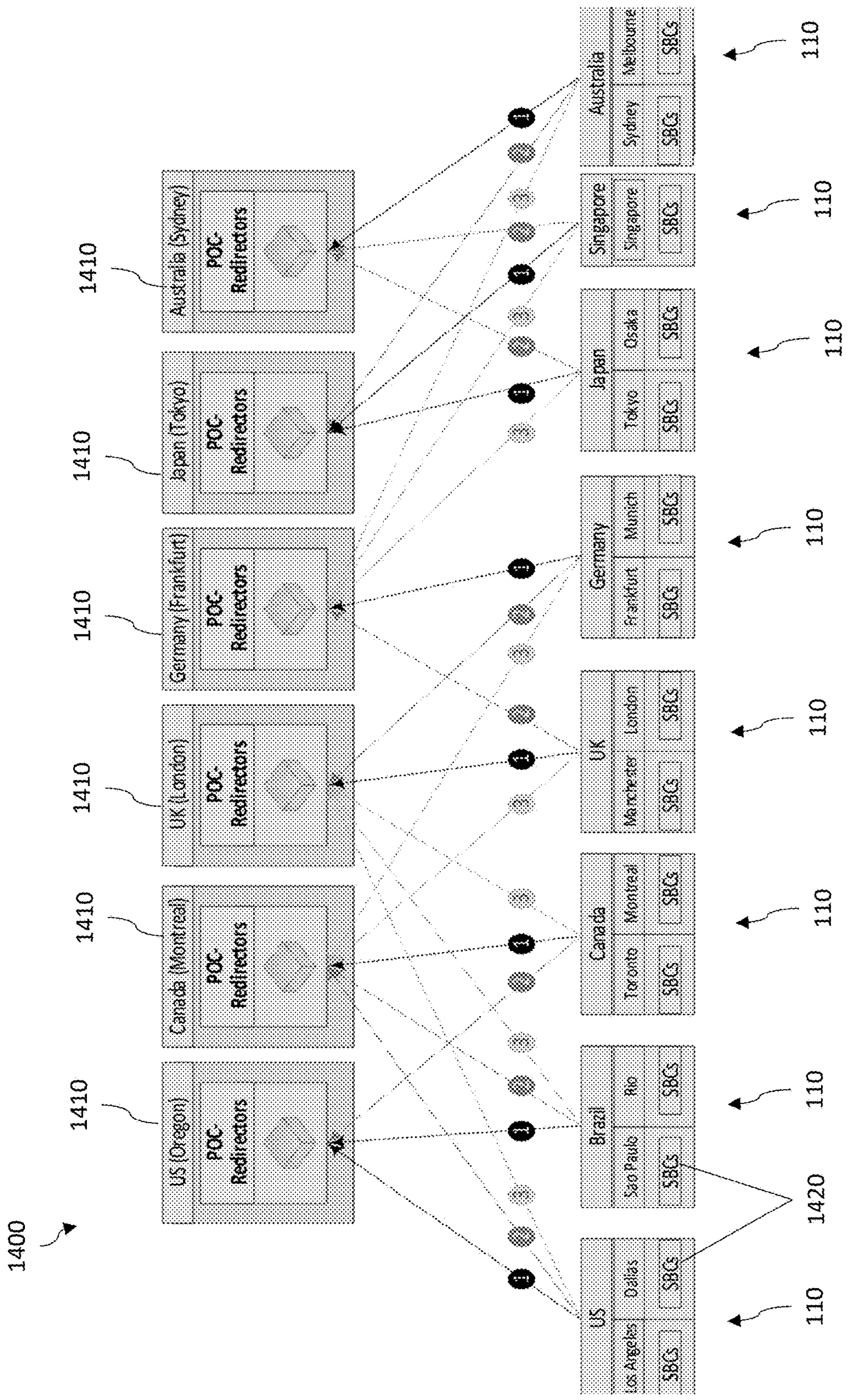
FIG. 14 is a schematic, diagrammatic representation of an example contact center network architecture, in accordance with at least one embodiment of the present disclosure.

FIG. 14 is a schematic, diagrammatic representation of an example contact center network architecture 1400, in accordance with at least one embodiment of the present disclosure.

The assignment of POC redirectors 1410 to SBCs 1420 is based on geographical location. In an example, each SBC 1420 is configured to communicate with two or three POC redirectors 1410, with priority given to the closest POC redirector 1410 as the first route choice, followed by the second and third closest sites as the second and third route choices, as depicted in FIG. 14, where the numbered circles 1,2, and 3 show the priority.

Figure 15:
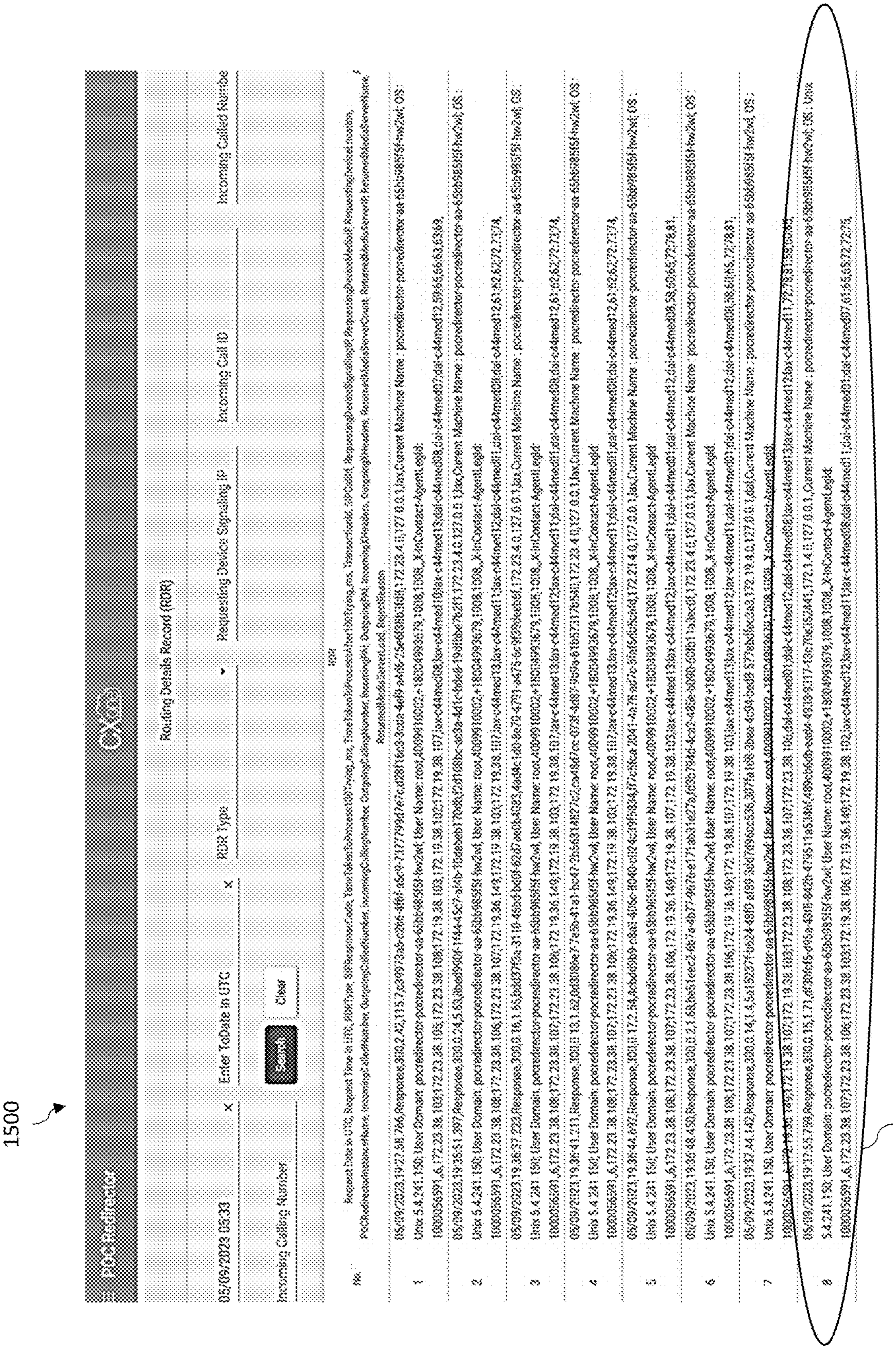
FIG. 15 is a POC redirector portal screen display showing routing detail records (RDRs), in accordance with at least one embodiment of the present disclosure.

FIG. 15 is a POC redirector portal screen display 1500 showing routing detail records (RDRs) 1510, in accordance with at least one embodiment of the present disclosure. Users can access RDRs 1510 through the POC redirector portal 2110 (see FIG. 21), and they have the option to search for specific RDRs 1510, as illustrated in FIG. 15. The POC redirector records all relevant information when it receives, processes, and responds to a request, capturing this data in a Routing Detail Record (RDR) 1510. The RDR 1510 contains details such as the Date, Time, Called and Calling Numbers, and other pertinent information related to the request and response. The response may be positive, where the POC redirector provides a list of media servers in the 300 MULTIPLE RESPONSE, or negative, where it rejects the call with a SIP Response code of 4XX, 5XX, or 6XX, for example, where the dialed number is not valid. In an example, the RDRs 1510 include 25 fields per record, as shown in Table 4.

TABLE 4

| Example routing detail record (RDR) | | | |
|---|---|---|---|
| Sl No | Field Name | Definition | Example1 |
| 1 | Request Date in UTC | Date Routing Request Received(MM/DD/YYYY) | May 9, 2023 |
| 2 | Request Time in UTC | Time of INVITE including miliseconds(hh:mm:ss:ms) | 19:27:58.766 |
| 3 | RDR Type | Type of RDR (Response/Reject) | Response |
| 4 | SIP Response Code | The SIP Code sent back | 300 |
| 5 | 100 Trying Process Time | Time it took POC-R to process 100 Trying in ms | 2.42 |
| 6 | Final Response Process Time | Time it took POC-R to process 3/4/5XX from 100 Trying in ms | 115.7 |
| 7 | POC-R Transaction ID | Unique ID of this transaction (internal to POC-R) | c39973a5-c266-4f6f-a5c9-7377799d7e7c |
| 8 | Incoming Call ID | Call ID in INVITE | d28f16c3-3cda-4ef9-a4d6-25e6f38b3fd8 |
| 9 | Requesting Device Signaling IP | IP of Device Sending Request | 172.23.4.0 |
| 10 | Requesting Device Media IP | IP of Device Sending Request | 127.0.0.1 |

TABLE 4-continued

Example routing detail record (RDR)

| Sl No | Field Name | Definition | Example1 |
|---|---|---|---|
| 11 | Requesting Device Location | Location of Device used for Geo-Location | Lax |
| 13 | POC-R Name | Name of POC-R Handling the request(if known) | Current Machine Name: pocredirector-aa-65bb985f5f-hw2wl; OS: Unix 5.4.241.150 |
| 14 | Incoming Called Number | Number in the Request URI | 4009910002 |
| 15 | Outgoing Called Number | Number in the 302 Contact (if applicable) | 18004993679 |
| 16 | Incoming Calling Number | Number/Text in From header | 1008 |
| 17 | Outgoing Calling Number | Number in the 302 Contact (if applicable) | 1008 |
| 18 | Incoming PAI | Number in the P-Asserted-ID in INVITE (if applicable) | |
| 19 | Outgoing PAI | Number in the P-Asserted-ID in 302 (if applicable) | |
| 20 | Incoming X-Headers | X-Header received (semicolon separate if available) | X-InContact-AgentLegId: 1000056591 |
| 21 | Outgoing X-Headers | X-Header sent (semicolon separate if available) | |
| 22 | Number of MS Returned | Number of Media Servers returned | 6 |
| 23 | IPs of MS Returned | IPS of MS returned(semicolon separated) | 172.23.38.103; 172.23.38.105; 172.23.38.108; 172.19.38.103; 172.19.38.102; 172.19.38.107 |
| 24 | Names of MS returned | Name of MS returned(semicolon separated) | lax-c44med08; lax-c44med10; lax-c44med13; dal-c44med08; dal-c44med07; dal-c44med12 |
| 25 | Load of MS Returned | Load of MS returned (semicolon separated) | 59; 65; 66; 63; 63; 69 |
| 26 | Reject Reason | Simple text explaining Reject cause(for failures) | |

Figure 16:
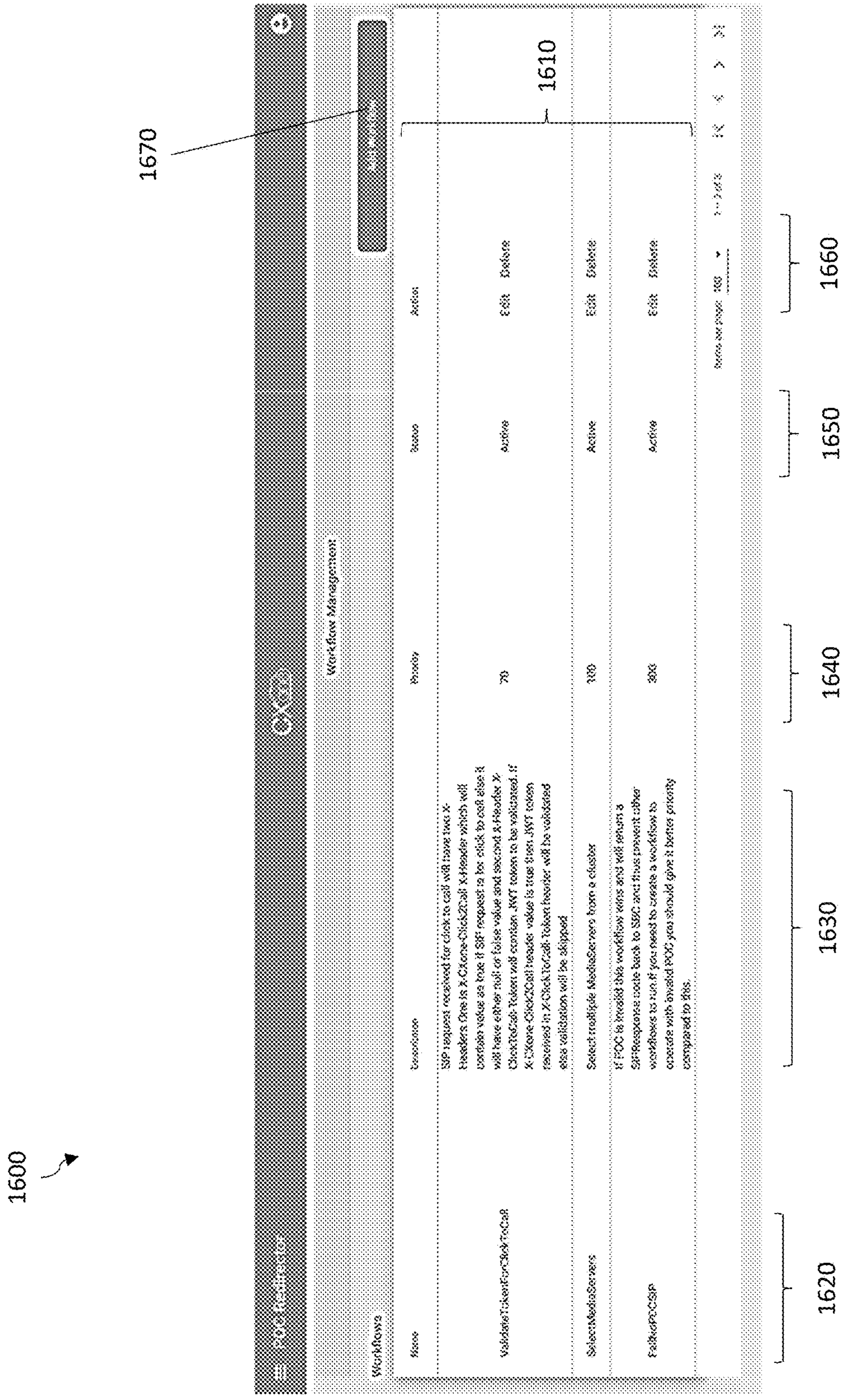
FIG. 16 is a POC redirector portal screen display showing workflows, in accordance with at least one embodiment of the present disclosure.

FIG. 16 is a POC redirector portal screen display 1600 showing workflows 1610, in accordance with at least one embodiment of the present disclosure. Each workflow 1610 includes a name 1620, a description 1630, a priority 1640 (e.g., a numerical score between 0 and 100), a status 1650 (e.g., Active or Inactive), and a list of allowed actions 1660. Also visible is an ADD WORKFLOW button 1670, that allows users to create a new workflow when desired, or when changing technical or business circumstances necessitate a change in routing logic.

Users can adjust the POC redirector's core logic through the Portal/graphical user interface (GUI) 2110 (see FIG. 21) using workflows 1610. These workflows 1610 enable, for example, the architecture, engineering, operations, and support teams to change routing logic without the need for traditional software development. In an example, a workflow 1610 can implement in minutes what would otherwise take days or weeks of coding to fully integrate into the system.

The POC redirector processes the workflows in order of priority, starting with the highest. When the conditions of the workflow match the current conditions, the POC redirector executes the instructions in the workflow and then exits the process. If the conditions do not match, the POC redirector proceeds to the next workflow 1610 until one executes, or it runs out of workflows. In some cases, multiple workflows may execute in order of their priority. FIG. 16 illustrates the workflow modification page 1600 of the POC redirector portal 2110.

For example, a user could create a workflow called "OneNumberRouting", which could contain a number(s) that the user would like to route to a specific IP(s). Those IPs may or may not be media servers. One application would be to test a new media server before it is put in production, or a media server that has been upgraded to a new software release. This could be used for example to test new network elements, such as new SBCs before they go into production. In this case the workflow would match the specific number contained within it and route the call to the IPs configured in it.

Another example would be to create a workflow called "CallingNumberRestriction", which could contain a list calling numbers that have been deemed as a nuisance by one or more of our customers. The workflow would be configured to reject calls from these numbers regardless of the POC being called.

Figure 17:
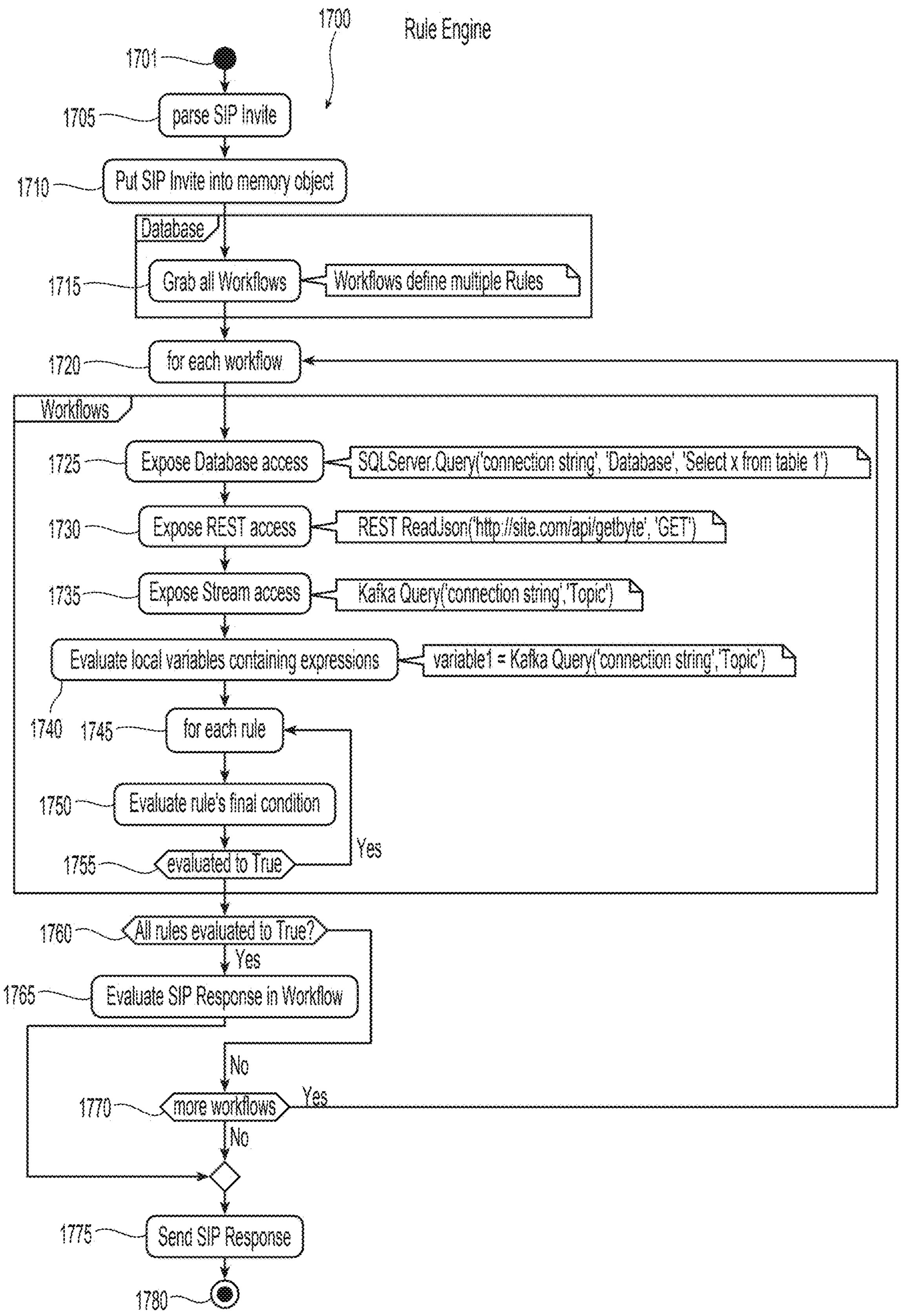
FIG. 17 is a diagrammatic view, in flow diagram form, of an example logic flow or method for the POC redirector application in response to receipt of an SIP Invite message, in accordance with at least one embodiment of the present disclosure.

FIG. 17 is a diagrammatic view, in flow diagram form, of an example logic flow or method 1700 for the POC redirector application in response to receipt of an SIP Invite message, in accordance with at least one embodiment of the present disclosure.

It is understood that the steps of method 1700 may be performed in a different order than shown in FIG. 17, additional steps can be provided before, during, and after the steps, and/or some of the steps described can be replaced or eliminated in other embodiments. One or more of steps of the method 1700 can be carried by one or more devices and/or systems described herein, such as components of the system 100, 200, 400, 600, 700, or 1000, the SBCs 630, the POC redirector 420, and/or processor circuit 2250.

In step 1701, the method 1700 begins. Execution then proceeds to step 1705.

In step 1705, the method 1700 includes parsing the SIP Invite message. Execution then proceeds to step 1710.

In step 1710, the method 1700 includes putting the SIP Invite message into a memory object. Execution then proceeds to step 1715.

In step 1715, the method 1700 includes retrieving all of the workflows from a workflow database, where each workflow defines at least one rule governing the routing of inbound calls. Execution then proceeds to step 1720.

In step 1720, the method 1700 includes iterating on all of the retrieved workflows. Execution then proceeds to step 1725.

Workflows can be configured to consume or obtain information from other sources as part of their decision making. For example, a workflow can be configured to obtain information from an external database by issuing a SQL query to that database. Thus, in step 1725, the method 1700 includes exposing the current workflow to a database. In an example, the workflow may perform a query of the database. Execution then proceeds to step 1730.

A workflow can be configured to consume an API from another system, by issuing a REST (representational state transfer) API call. REST APIs are modern types of API that leverage open web technologies and HTTP methods (GET, POST, PUT, DELETE) to URLs. Thus, in step 1730, the method 1700 includes exposing the current workflow to (for example) a REST (representational state transfer). In an example, the workflow may retrieve information from a website or other URL. Execution then proceeds to step 1735.

A workflow could consume a real time "stream"—a source of data being delivered in real-time from another system. For example, a workflow could be receiving logs from a billing system and, as soon as a customer has reached a certain dollar amount, the workflow could be configured to start rejecting traffic to that customer. Thus, in step 1735, the method 1700 includes exposing the current workflow to the real-time data stream. In an example, the workflow may query a management tool such as Kafka. Execution then proceeds to step 1740.

In step 1740, the method 1700 includes iterating on each rule in the workflow. Execution then proceeds to step 1750.

In step 1750, the method 1700 includes evaluating the current rule against the current conditions at the POC redirector. Execution then proceeds to step 1755.

In step 1755, the method 1700 includes determining whether the current rule evaluates as True. If yes, execution then returns to step 1745. If no, execution then returns to step 1760.

In step 1760, the method 1700 includes determining whether all rules of the current workflow have evaluated to true. If yes, then execution proceeds to step 1765. If no, then execution proceeds to step 1770.

In step 1765, the method 1700 includes evaluating the SIP response in the current workflow. The evaluation may be a "positive" response (i.e., a 300 MULTIPLE CHOICES SIP response with a list of media servers in order of priority), or a "negative" repose (i.e., reject the Call with a 4XX, 5XX or 6XX SIP response code). Execution then proceeds to step 1775.

In step 1770, the method 1700 includes determining whether there are more workflows. If yes, then execution returns to step 1720. If no, execution then proceeds to step 1775.

In step 1775, the method 1700 includes sending the appropriate SIP response (e.g., either 300 MULTIPLE CHOICES, 4XX, 5XX or 6XX SIP response code, etc.). Execution then proceeds to step 1780.

In step 1780, the method 1700 is complete.

Flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, polling all of the media servers on the contact center network every 10 seconds, and using this information to update call routing instructions to the SBCs every time an incoming call is received, are tasks that require numerous logic steps to occur in real time or near-real time.

Besides workflow management and RDR display/search, the portal/GUI 2110 (see FIG. 21) offers additional functionality such as user management, cluster management (addition and removal), media server management (search, manually override state), and POC search.

Figure 18:
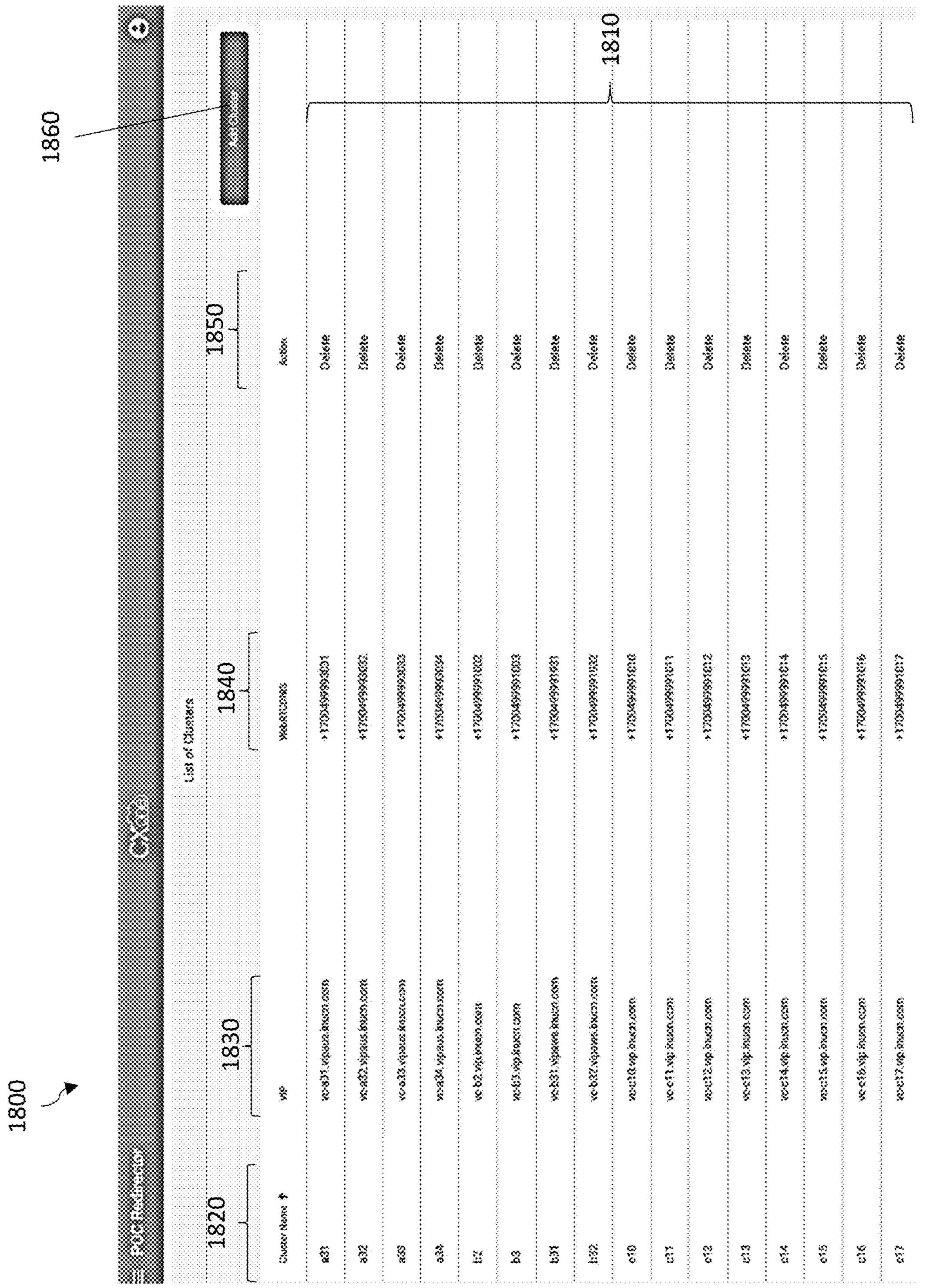
FIG. 18 is a POC redirector portal screen display for management of clusters, in accordance with at least one embodiment of the present disclosure.

FIG. 18 is a POC redirector portal screen display 1800 for management of clusters 1810, in accordance with at least one embodiment of the present disclosure. Each cluster 1810 has a name 1820, a URL or IP address 1830, an associated telephone number 1840, and a list of available actions 1850. Also visible is a button 1860 that allows the user to add a new cluster to the network.

Figure 19:
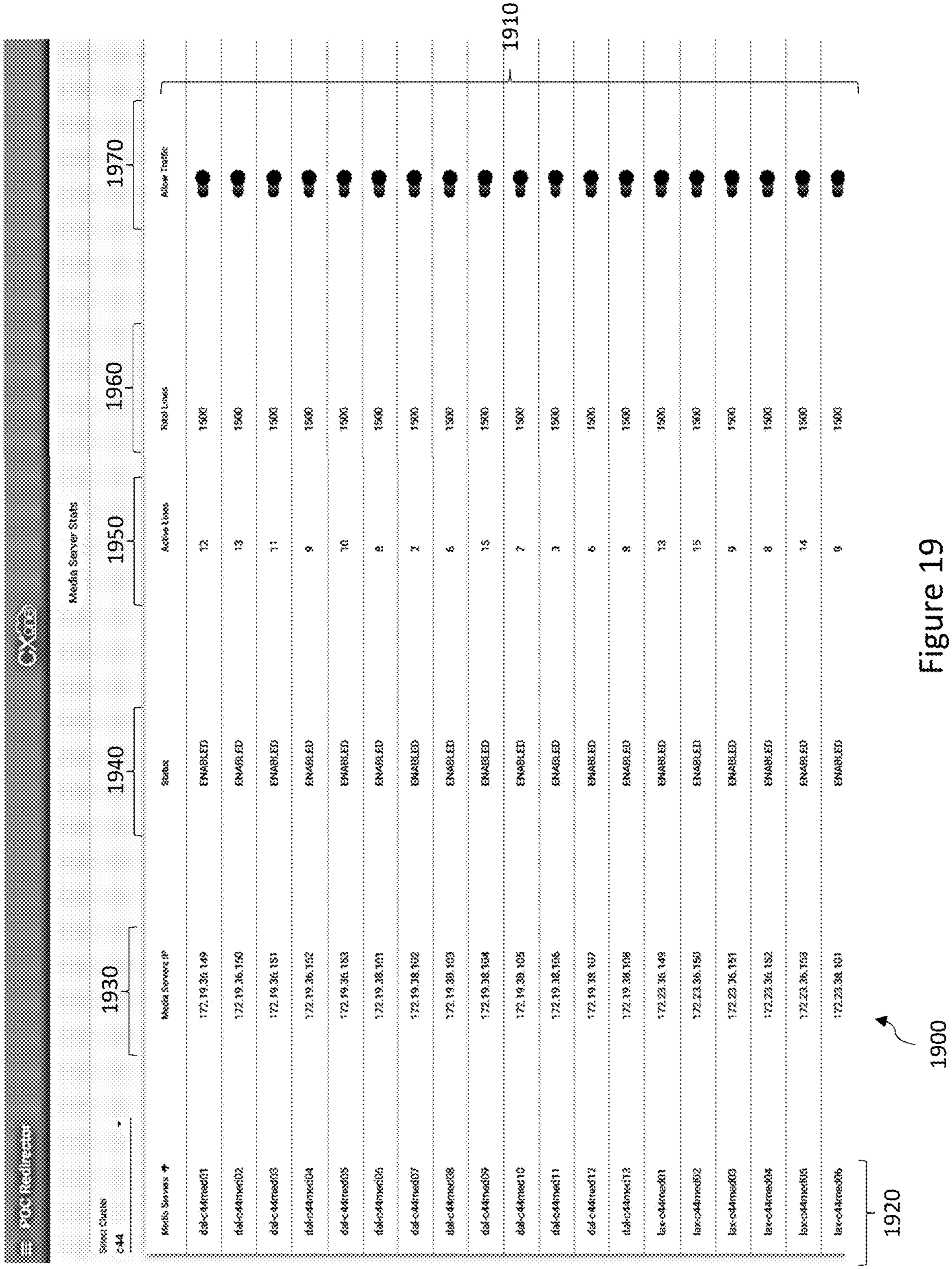
FIG. 19 is a POC redirector portal screen display for management of media servers, in accordance with at least one embodiment of the present disclosure.

FIG. 19 is a POC redirector portal screen display 1900 for management of media servers 1910, in accordance with at least one embodiment of the present disclosure. Each media server 1910 has a name 1920, an IP address 1930, a current status 1940 (e.g., Enabled or Disabled), a number of active lines 1950, a number of total lines 1960, and an on/off switch 1970 indicating whether traffic is allowed to this media server or not.

Figure 20:
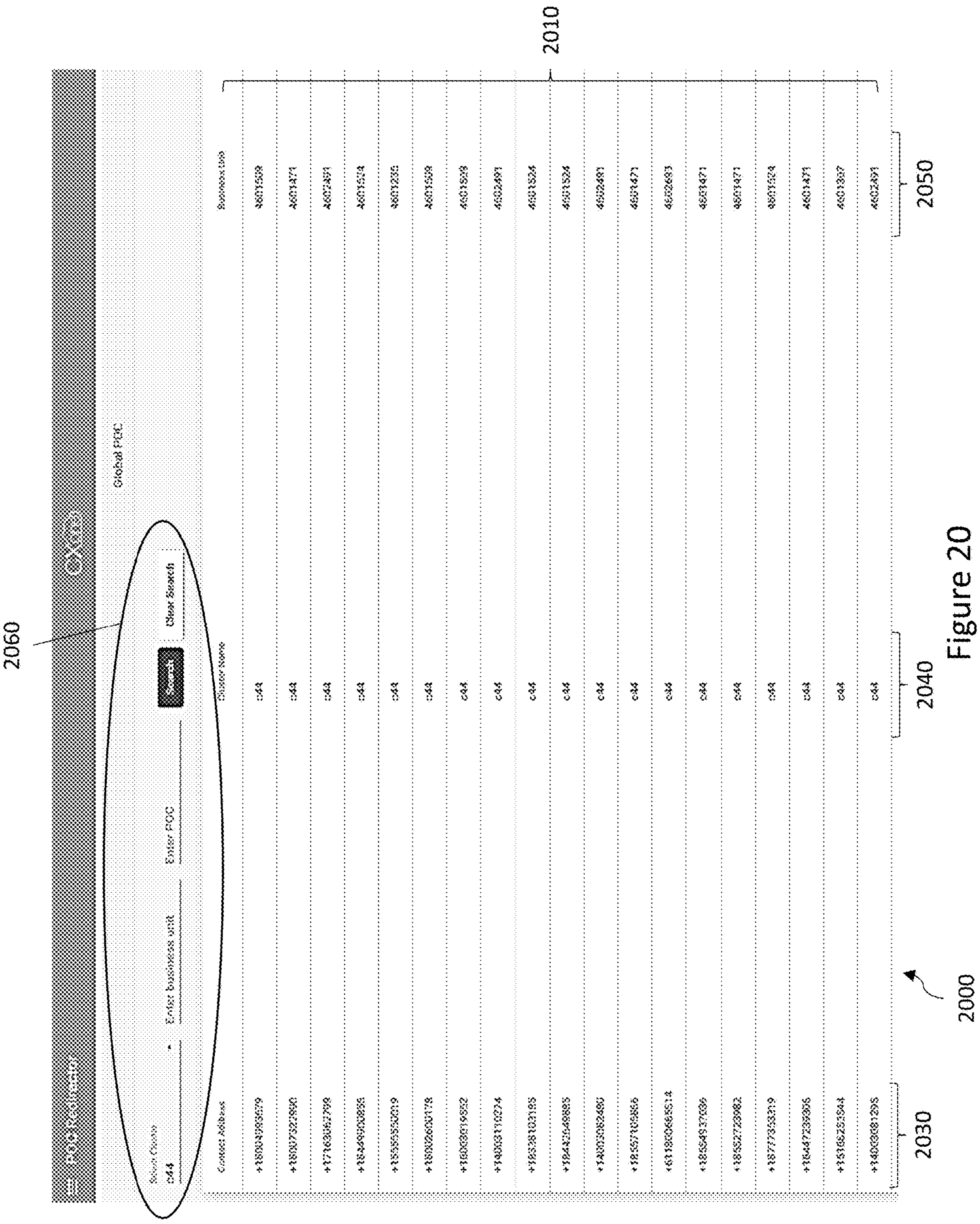
FIG. 20 is a POC redirector portal screen display for management of POCs, in accordance with at least one embodiment of the present disclosure.

FIG. 20 is a POC redirector portal screen display 2000 for management of POCs 2010, in accordance with at least one embodiment of the present disclosure. Each POC 2010 has a telephone number or contact address 2030, an associated cluster name 2040, and an associated business unit 2050. Also visible is a search tool 2060.

Figure 21:
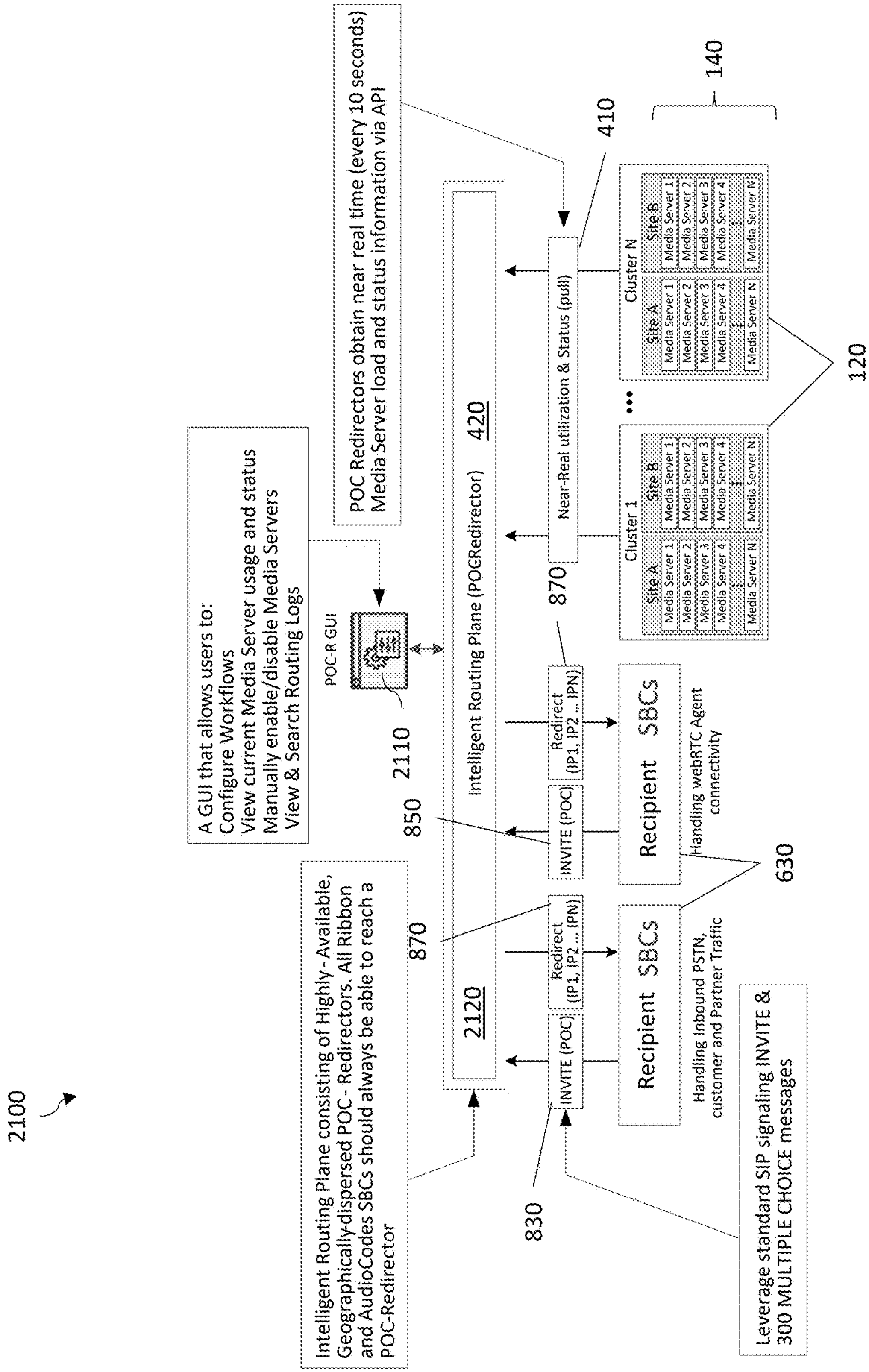
FIG. 21 is a high-level architecture diagram of a call center network incorporating a POC redirector, in accordance with at least one embodiment of the present disclosure.

FIG. 21 is a high-level architecture diagram 2100 of a call center network incorporating a POC redirector 420, in accordance with at least one embodiment of the present disclosure. Visible are the clusters 120, media servers 140, the near-real-time status 410 of the media servers 140, the POC redirector 420, the SBCs 630, SIP Invite messages 830, 850, redirect (SIP Multiple Choice) messages 870, and the POC redirector portal or GUI 2110.

In an example, the GUI 2110 allows user to configure workflows, view current usage and status of media servers, manually enable or disable media servers, and view and search RDRs. In an example, an intelligent routing plane 2120 consists of multiple POC redirectors 420 that are geographically dispersed, such that each SBC and each type of SBC is always able to reach at least one POC redirector 420.

Figure 22:
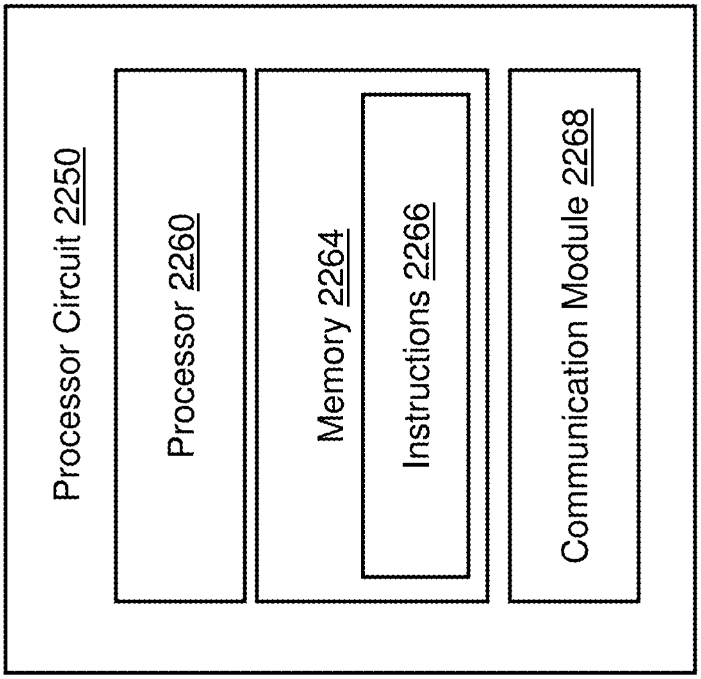
FIG. 22 is a schematic diagram of a processor circuit, in accordance with at least one embodiment of the present disclosure.

FIG. 22 is a schematic diagram of a processor circuit 2250, in accordance with at least one embodiment of the present disclosure. The processor circuit 2250 may be implemented in 100, 200, 400, 600, 700, or 1000, the SBCs 630, the POC redirector 420, or other devices or workstations (e.g., third-party workstations, network routers, etc.), or on a cloud processor or other remote processing unit, as necessary to implement the method. As shown, the processor circuit 2250 may include a processor 2260, a memory 2264, and a communication module 2268. These elements may be in direct or indirect communication with each other, for example via one or more buses.

The processor 2260 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 2260 may also comprise another hardware device, a firmware device, or any combination thereof configured to perform the operations described herein. The processor 2260 may also be implemented as a combination of computing devices, e.g., a combination of a DSP and a microprocessor, a plurality of microprocessors, one or more microprocessors in conjunction with a DSP core, or any other such configuration.

The memory 2264 may include a cache memory (e.g., a cache memory of the processor 2260), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 2264 includes a non-transitory computer-readable medium. The memory 2264 may store instructions 2266. The instructions 2266 may include instructions that, when executed by the processor 2260, cause the processor 2260 to perform the operations described herein. Instructions 2266 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 2268 can include any electronic circuitry and/or logic circuitry to facilitate direct or indirect communication of data between the processor circuit 2250, and other processors or devices. In that regard, the communication module 2268 can be an input/output (I/O) device. In some instances, the communication module 2268 facilitates direct or indirect communication between various elements of the processor circuit 2250 and/or the contact center network as described herein. The communication module 2268 may communicate within the processor circuit 2250 through numerous methods or protocols. Serial communication protocols may include but are not limited to United States Serial Protocol Interface (US SPI), Inter-Integrated Circuit ($I^2C$), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and a central server, or readings from the media servers) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the point of contact redirector provides a robust, flexible means of redirecting incoming call traffic to the least-busy media server that meets geographic and availability criteria. Accordingly, it can be seen that the point of contact redirector fills a long-standing need in the art, by providing a readily adaptable system component that is aware, in real time or near-real time, of the loading of each media server on the network. The point of contact redirector can be reprogrammed using simple workflow scripts, and keeps records of each call redirection for diagnostic purposes.

A number of variations are possible on the examples and embodiments described above. For example, a contact center network may include more or fewer countries, more or fewer clusters per country, more or fewer sites per cluster, and more or fewer media servers per site than described herein, without departing from the spirit of the present disclosure. The system can function with one or a plurality of POC redirectors. The technology described herein may be applied not only to contact centers, but to 911 services, and any other service or system that handles large volumes of incoming and outgoing call traffic.

Accordingly, the logical operations making up the embodiments of the technology described herein are referred to variously as operations, steps, objects, elements, components, or modules. Furthermore, it should be understood that these may occur, or be performed or arranged, in any order, unless explicitly claimed otherwise or a specific order is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the point of contact redirector. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the point of contact redirector as defined in the claims. Although various embodiments of the claimed subject matter have been described above with a certain degree of particularity, or with reference to one or more individual embodiments, those of ordinary skill in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system adapted to automatically optimize the routing of incoming calls, the system comprising:

a session controller, a session border controller (SBC);

a first plurality of media servers, a second plurality of media servers;

a point of contact;

a processor and a non-transitory computer readable medium operably coupled thereto, the computer readable medium comprising a plurality of instructions stored in association therewith that are accessible to, and executable by, the processor, to perform operations which comprise:

regularly polling the first plurality of media servers to determine a first group of most-available servers;

regularly polling the second plurality of media servers to determine a second group of most-available servers;

when the session controller receives an inbound call from a patron device to the point of contact:

determining a list of most-available servers from at least one of the first group of most-available servers or the second group of most-available servers, in a priority order based on a plurality of factors, wherein the plurality of factors comprises at least one of server load, a location, or a server operational status;

transmitting, to the SBC, a redirect message comprising the list of most-available servers in the priority order;

sequentially initiating, by the SBC, call setup attempts to the most-available servers in accordance with the priority order until a media server accepts, and connecting, by the SBC, the inbound call to the media server that accepted a corresponding call-setup attempt.

2. The system of claim 1, wherein the first group of most-available servers or the second group of most-available servers comprises three servers.

3. The system of claim 1, wherein:

determining the first group of most-available servers; or determining the second group of most-available servers; or determining the list in the priority order involves a workflow comprising at least one rule.

4. The system of claim 3, wherein the at least one rule comprises a Boolean expression.

5. The system of claim 3, wherein the operations further comprise:

if the Boolean expression is TRUE, performing a first action; and if the Boolean expression is FALSE, performing a second action.

6. The system of claim 3, wherein the at least one rule comprises at least one nested rule.

7. The system of claim 3, wherein the workflow involves preferentially routing the incoming call to a server of the first group of preferred servers or the second group of preferred servers that is geographically closest to a point of origin of the incoming call.

8. The system of claim 1, wherein the first plurality of media servers and the second plurality of media servers are located in separate geographic regions.

9. The system of claim 1, wherein determining the first group of most-available servers and determining the second group of most-available servers involves searching for least-used servers that are not subject to duress or outage.

10. The system of claim 1, wherein connecting the inbound call to the point of contact involves generating a routing detail record comprising a date, a time, an IP address of a device requesting the call, an incoming call ID, an incoming called number, a transaction ID, an SIP response code, information regarding media servers for multiple choice responses, reject reason for reject responses, incoming X-headers, incoming calling number.

11. A computer-implemented method adapted to automatically optimize the routing of incoming calls, which method comprises:

regularly polling a first plurality of media servers to determine a first group of most-available servers;

regularly polling a second plurality of media servers to determine a second group of most-available servers;

when a session controller receives an inbound call to a point of contact:

determining a list of most-available servers from at least one of the first group of most-available servers or the second group of most-available servers, in a priority order based on a plurality of factors, wherein the plurality of factors comprises at least one of server load, a location, or a server operational status;

transmitting, to a session border controller (SBC), a redirect message comprising the list of most-available servers in the priority order;

sequentially initiating, by the SBC, call setup attempts to the most-available servers in accordance with the priority order until a media server accepts; and connecting, by the SBC, the inbound call to the media server that accepted a corresponding call-setup attempt.

12. The method of claim 11, wherein the first group of most-available servers or the second group of most-available servers comprises three servers.

13. The method of claim 11, wherein:

determining the first group of most-available servers; or determining the second group of most-available servers; or determining the list in the priority order involves a workflow comprising at least one rule.

14. The method of claim 13, wherein the at least one rule comprises a Boolean expression.

15. The method of claim 13, further comprising:

if the Boolean expression is TRUE, performing a first action; and if the Boolean expression is FALSE, performing a second action.

16. The method of claim 13, wherein the at least one rule comprises at least one nested rule.

17. The method of claim 13, wherein the workflow involves preferentially routing the incoming call to a server of the first group of preferred servers or the second group of preferred servers that is geographically closest to a point of origin of the incoming call.

18. The method of claim 11, wherein the first plurality of media servers and the second plurality of media servers are located in separate geographic regions.

19. The method of claim 11, wherein determining the first group of most-available servers and determining the second group of most-available servers involves searching for least-used servers that are not subject to duress or outage.

20. The method of claim 11, wherein connecting the inbound call to the point of contact involves generating a routing detail record comprising a date, a time, an IP address of a device requesting the call, an incoming call ID, an incoming called number, a transaction ID, an SIP response code, information regarding media servers for multiple choice responses, reject reason for reject responses, incoming X-headers, incoming calling number.

* * * * *